United States Patent [19]

Kitamura

[11] Patent Number: 4,742,399
[45] Date of Patent: May 3, 1988

[54] METHOD OF AND APPARATUS FOR GENERATING HIGH-RESOLUTION BILEVEL IMAGE DATA

[75] Inventor: Hideaki Kitamura, Ibaraki, Japan

[73] Assignee: Dainippon Screen Mfg. Co., Ltd., Kyoto, Japan

[21] Appl. No.: 915,680

[22] Filed: Oct. 6, 1986

[30] Foreign Application Priority Data

Nov. 1, 1985 [JP] Japan ................. 60-246792
Jan. 9, 1986 [JP] Japan ................. 61-3351

[51] Int. Cl.$^4$ .............................................. H04N 1/40
[52] U.S. Cl. ................................... 358/284; 358/280; 358/282
[58] Field of Search .................... 358/280, 282, 284

[56] References Cited

U.S. PATENT DOCUMENTS

| | | | |
|---|---|---|---|
| 4,237,495 | 12/1980 | Yamamoto | 358/282 |
| 4,280,144 | 7/1981 | Bacon | 358/280 |
| 4,570,186 | 2/1986 | Kurata | 358/282 |
| 4,577,235 | 3/1986 | Kannapell | 358/282 |
| 4,626,902 | 12/1986 | Yamada | 358/280 |

Primary Examiner—Howard W. Britton
Attorney, Agent, or Firm—Lowe, Price, LeBlanc, Becker & Shur

[57] ABSTRACT

A bilevel original is read in the form of multi-gradation image data stored as 3 by 3 pixels in a latch circuit. An ROM stores data of bilevel image patterns higher in resolution than the multi-gradation image data. The stored data are related to every combination of gradation values of a central pixel in 3 by 3 image regions and data patterns of peripheral pixels thereof. The image data stored in the latch circuit are supplied as an address input to the ROM, which in turn outputs corresponding high-resolution bilevel image pattern data.

14 Claims, 22 Drawing Sheets

| PERIPHERAL PIXEL / GRADATION OF CENTRAL PIXEL |  |  |  |
|---|---|---|---|
| 0 |  |  |  |
| 1 |  |  |  |
| 2 |  |  |  |
| 3 |  |  |  |
| 4 |  |  |  |
| 5 |  |  |  |
| 6 |  |  |  |
| 7 | | | |

| PERIPHERAL PIXEL / GRADATION OF CENTRAL PIXEL |  |  |  |
|---|---|---|---|
| 0 |  |  |  |
| 1 |  |  |  |
| 2 |  |  |  |
| 3 |  |  |  |
| 4 |  |  |  |
| 5 |  |  |  |
| 6 |  |  |  |
| 7 | | | |

FIG. 4C

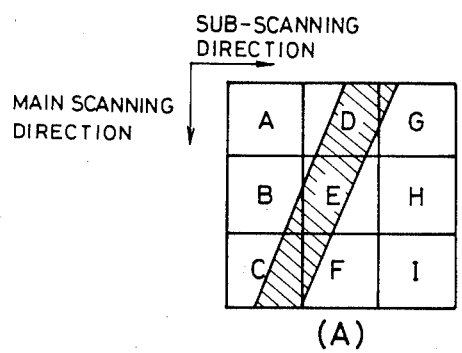
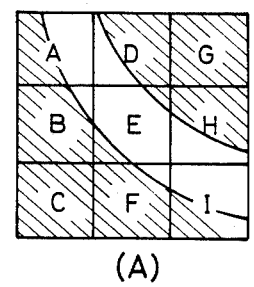
FIG. 5
FIG. 6

FIG. 11

|   |   |   |
|---|---|---|
| A | D | G |
| B | E | H |
| C | F | I |

(A)

| 0 | 4 | 0 |
|---|---|---|
| 0 | 4 | 0 |
| 3 | 2 | 0 |

(B)

| 0 | 1 | 0 |
|---|---|---|
| 0 | 4 | 0 |
| 1 | 0 | 0 |

|   |   |   |
|---|---|---|
| A | D | G |
| B | E | H |
| C | F | I |

(A)

| 4 | 5 | 7 |
|---|---|---|
| 7 | 2 | 5 |
| 7 | 6 | 4 |

(B)

| 0 | 1 | 1 |
|---|---|---|
| 1 | 2 | 1 |
| 1 | 1 | 0 |

| IMAGE (4bit) | | | DENSITY SUM | DENSITY SUM Sj IN LOGIC WINDOW | | | HIGH-RESOLUTION BILEVEL IMAGE DATA ej | | | RANG OF THRESHOLD VALUE SL |
|---|---|---|---|---|---|---|---|---|---|---|
| A | D | G | | $S_1$ | $S_4$ | $S_7$ | $e_1$ | $e_4$ | $e_7$ | |
| B | E | H | | $S_2$ | $S_5$ | $S_8$ | $e_2$ | $e_5$ | $e_8$ | |
| C | F | I | | $S_3$ | $S_6$ | $S_9$ | $e_3$ | $e_6$ | $e_9$ | |
| (1) 8 | 15 | 15 | 128 | 347 | 361 | 375 | 1 | 1 | 1 | OVER 348 |
| 15 | 15 | 15 | | 361 | 368 | 375 | 1 | 1 | 1 | |
| 15 | 15 | 15 | | 375 | 375 | 375 | 1 | 1 | 1 | |
| (2) 5 | 12 | 15 | 119 | 299 | 328 | 357 | 1 | 1 | 1 | OVER 300 |
| 12 | 15 | 15 | | 328 | 347 | 366 | 1 | 1 | 1 | |
| 15 | 15 | 15 | | 357 | 366 | 375 | 1 | 1 | 1 | |
| (3) 2 | 10 | 15 | 112 | 263 | 304 | 345 | 1 | 1 | 1 | OVER 264 |
| 10 | 15 | 15 | | 304 | 332 | 360 | 1 | 1 | 1 | |
| 15 | 15 | 15 | | 345 | 360 | 375 | 1 | 1 | 1 | |
| (4) 0 | 8 | 15 | 106 | 231 | 282 | 333 | 1 | 1 | 1 | OVER 232 |
| 8 | 15 | 15 | | 282 | 318 | 354 | 1 | 1 | 1 | |
| 15 | 15 | 15 | | 333 | 354 | 375 | 1 | 1 | 1 | |
| (5) 0 | 4 | 12 | 89 | 156 | 213 | 270 | 0 | 1 | 1 | 213 ∫ 157 |
| 4 | 12 | 15 | | 213 | 261 | 309 | 1 | 1 | 1 | |
| 12 | 15 | 15 | | 270 | 309 | 348 | 1 | 1 | 1 | |
| (6) 0 | 2 | 10 | 79 | 114 | 173 | 232 | 0 | 0 | 1 | 227 ∫ 174 |
| 2 | 10 | 15 | | 173 | 227 | 281 | 0 | 1 | 1 | |
| 10 | 15 | 15 | | 232 | 281 | 330 | 1 | 1 | 1 | |
| (7) 0 | 0 | 8 | 69 | 72 | 133 | 194 | 0 | 0 | 1 | 193 ∫ 134 |
| 0 | 8 | 15 | | 133 | 193 | 253 | 0 | 1 | 1 | |
| 8 | 15 | 15 | | 194 | 253 | 312 | 1 | 1 | 1 | |
| (8) 0 | 0 | 4 | 51 | 36 | 80 | 124 | 0 | 0 | 0 | 182 ∫ 132 |
| 0 | 4 | 12 | | 80 | 131 | 182 | 0 | 0 | 1 | |
| 4 | 12 | 15 | | 124 | 182 | 240 | 0 | 1 | 1 | |
| (9) 0 | 0 | 0 | 31 | 0 | 24 | 48 | 0 | 0 | 0 | BELOW 156 |
| 0 | 0 | 8 | | 24 | 63 | 102 | 0 | 0 | 0 | |
| 0 | 8 | 15 | | 48 | 102 | 156 | 0 | 0 | 0 | |

FIG. 23

| IMAGE (4 bit) | | | DENSITY SUM | DENSITY SUM Sj IN LOGIC WINDOW | | | THRESHOLD VALUE BASED ON FIG. 7 | HIGH-RESOLUTION BILEVEL IMAGE DATA $e_j$ | | |
|---|---|---|---|---|---|---|---|---|---|---|
| A | D | G | | $S_1$ | $S_4$ | $S_7$ | | $e_1$ | $e_4$ | $e_7$ |
| B | E | H | | $S_2$ | $S_5$ | $S_8$ | | $e_2$ | $e_5$ | $e_8$ |
| C | F | I | | $S_3$ | $S_6$ | $S_9$ | | $e_3$ | $e_6$ | $e_9$ |
| 0 | 8 | 8 | | 168 | 160 | 152 | | 1 | 1 | 1 |
| 8 | 8 | 0 | 40 | 160 | 136 | 112 | 130 | 1 | 1 | 0 |
| 8 | 0 | 0 | | 152 | 112 | 72 | | 1 | 0 | 0 |
| 0 | 1 | 8 | | 84 | 100 | 116 | | 0 | 0 | 0 |
| 1 | 8 | 1 | 28 | 100 | 100 | 100 | 130 | 0 | 0 | 0 |
| 8 | 1 | 0 | | 116 | 100 | 84 | | 0 | 0 | 0 |
| 15 | 8 | 1 | | 165 | 149 | 133 | | 1 | 0 | 0 |
| 8 | 1 | 12 | 73 | 149 | 161 | 173 | 155 | 0 | 1 | 1 |
| 1 | 12 | 15 | | 133 | 173 | 213 | | 0 | 1 | 1 |

FIG. 24

| IMAGE (4 bit) | | | DENSITY SUM | DENSITY SUM Sj IN LOGIC WINDOW | | |
|---|---|---|---|---|---|---|
| A | D | G | | $S_1$ | $S_4$ | $S_7$ |
| B | E | H | | $S_2$ | $S_5$ | $S_8$ |
| C | F | I | | $S_3$ | $S_6$ | $S_9$ |
| 0 | 8 | 8 | | 96 | 112 | 96 |
| 8 | 8 | 0 | 40 | 112 | 96 | 64 |
| 8 | 0 | 0 | | 96 | 64 | 32 |
| 0 | 1 | 8 | | 40 | 64 | 72 |
| 1 | 8 | 1 | 28 | 64 | 84 | 64 |
| 8 | 1 | 0 | | 72 | 64 | 40 |
| 15 | 8 | 1 | | 128 | 90 | 88 |
| 8 | 1 | 12 | 73 | 90 | 80 | 114 |
| 1 | 12 | 15 | | 88 | 114 | 160 |

(A) BILEVEL ORIGINAL

| X1 | X2 | X3 | X4 | X5 |
|---|---|---|---|---|
| 0 | 0 | 0 | 0 | 8 |
| 0 | 0 | 0 | 8 | 15 |
| 0 | 0 | 8 | 15 | 15 |
| 0 | 6 | 15 | 15 | 15 |
| 0 | 8 | 15 | 15 | 15 |
| 0 | 8 | 15 | 15 | 15 |
| 0 | 8 | 15 | 15 | 15 |
| 0 | 13 | 15 | 15 | 15 |
| 2 | 15 | 15 | 15 | 15 |
| 7 | 15 | 15 | 15 | 15 |

(B) GRADATION DATA (C) COMPRESSED FORMAT

| p | q | r |
|---|---|---|

(D) NON COMPRESSED FORMAT

| p | ✕ | ✕ | t |
|---|---|---|---|

(E)

| p | 1 : COMPRESSED DATA<br>0 : NON-COMPRESSED DATA |
|---|---|
| q | 1 : COMPRESSED DATA OF "15"<br>0 : COMPRESSED DATA OF "0" |
| r | LENGTH OF COMPRESSED DATA |
| t | GRADATION VALUE OF NON-COMPRESSED DATA |
| ✕ | don't care |

(F) COMPRESSED DATA IN COLUMN × 2

| 1 | 0 | 3 |
|---|---|---|
| 0 | ✕✕ | 6 |
| 0 | ✕✕ | 8 |
| 0 | ✕✕ | 8 |
| 0 | ✕✕ | 8 |
| 0 | ✕✕ | 13 |
| 1 | 1 | 2 |

FIG. 28

| IMAGE (4 bit) | | | DENSITY SUM S | DENSITY SUM S IN LOGIC WINDOW | | | HIGH-RESOLUTION BILEVEL DATA ej | | | FINAL THRESHOLD VALUE SL |
|---|---|---|---|---|---|---|---|---|---|---|
| A | D | G | | $S_1$ | $S_4$ | $S_7$ | $e_1$ | $e_4$ | $e_7$ | |
| B | E | H | | $S_2$ | $S_5$ | $S_8$ | $e_2$ | $e_5$ | $e_8$ | |
| C | F | I | | $S_3$ | $S_6$ | $S_9$ | $e_3$ | $e_6$ | $e_9$ | |
| 0 | 8 | 8 | | 96 | 112 | 96 | 1 | 1 | 1 | |
| (1) 8 | 8 | 0 | 40 | 112 | 96 | 64 | 1 | 1 | 0 | 95 |
| 8 | 0 | 0 | | 96 | 64 | 32 | 1 | 0 | 0 | |
| 0 | 1 | 8 | | 40 | 64 | 72 | 0 | 1 | 1 | |
| (2) 1 | 8 | 1 | 28 | 64 | 84 | 64 | 1 | 1 | 1 | 63 |
| 8 | 1 | 0 | | 72 | 64 | 40 | 1 | 1 | 0 | |
| 15 | 8 | 1 | | 128 | 90 | 88 | 0 | 0 | 0 | |
| (3) 8 | 1 | 12 | 73 | 90 | 80 | 114 | 0 | 0 | 0 | 159 |
| 1 | 12 | 15 | | 88 | 114 | 160 | 0 | 0 | 1 | |

METHOD OF AND APPARATUS FOR GENERATING HIGH-RESOLUTION BILEVEL IMAGE DATA

BACKGROUND OF THE INVENTION

1. Field of the Invention

The present invention relates generally to a method of and apparatus for generating high-resolution bilevel image data, and more particularly, to a method of and apparatus for scanning bilevel originals (e.g., black-and-white originals) and processing multi-gradation image data to generate bilevel image data which are higher in resolution than the inputted multi-gradation image data.

2. Description of the Prior Art

In an image scanning/recording device, input image data obtained by scanning an original are limited in resolution due to technical or economic considerations. For example, a typical commercially available CCD imagescanner for reading has an upper limit of a scanning line number of 400 lines/inch (input resolution of 63.5 μm square) in the existing circumstances, and such resolution is sufficient in practice.

In the field of commercial printing and publishing printing requiring high quality, on the other hand, it is said that resolution preferably exceeds an output scanning line number of at least 1500 lines/inch (16.9 μm square) so that no jagged portion is defined on the edges of an image developed by bilevel image processing device that scans a bilevel image, performs image processing on it and outputs the image in full-size magnification. Such high resolution is required also in the input area on the premise of full-size processing. However, a bilevel image input device capable of reading an image with a resolution exceeding 1500 lines/inch is considerably more expensive.

SUMMARY OF THE INVENTION

The present invention is directed to a method of and apparatus for generating high resolution bilevel image data from multi-gradation image data.

According to the present invention, a bilevel original is read in the form of multi-gradation image data to generate high resolution bilevel image data through gradation of the multi-gradation image data.

In an aspect of the present invention, bilevel image pattern data higher in resolution than the multi-gradation image data from which the bilivel image data are obtained are first related to every combination of gradation levels of a central pixel in an image region of prescribed size and data patterns of peripheral pixels. The high-resolution bilevel image pattern data are outputted for respective pixels of the read multi-gradation image data in response to gradation values thereof and data patterns of the peripheral pixels along the said relation. Thus, high-resolution bilevel image data can be obtained from image data read in low resolution.

In accordance with one embodiment, data on peripheral pixels are discriminated by prescribed threshold values to be processed as image data smaller in gradation number than the central pixel, thereby to reduce data capacity for the relating operation.

The threshold values may be varied with the total sum of the gradation values of the entire peripheral pixel data to be large or small in proportion to the total sum, thereby to convert the peripheral pixel data to bilevel image data on the basis of the threshold values. Thus, an original including fine lines can be more correctly highly-resolved.

In another aspect of the present invention, pixels in a prescribed image region around a central pixel of multi-gradation image data as read are noted in order to process the central pixel, to obtain the density sum of the said multi-gradation image data in a logic window of prescribed size contained in the said prescribed image region around a high-resolution pixel with respect to each high-resolution pixel obtained by dividing the central pixel by a prescribed number. The density sum is compared with a previously set threshold value to convert into bilevel values the high-resolved pixel. Thus, high-resolution bilevel image data can be obtained from image data read in low resolution.

Accordingly, it is an object of the present invention to overcome the aforementioned disadvantages of the prior art and provide a method of and an apparatus for generating bilevel image data having a higher resolution and in further fidelity than input image data obtained through a general low resolution image input device.

These and other objects, features, aspects and advantages of the present invention will become more apparent from the following detailed description of the present invention when taken in conjunction with the accompanying drawings.

BRIEF DESCRIPTION OF DRAWINGS

FIGS. 2, 3, 5, 6, 11 and 12 are diagrams showing a procedure for carrying out image processing in accordance with the first embodiment;

FIGS. 4A to 4C illustrate examples of high-resolution bilevel image patterns;

FIG. 22 is a diagram showing results of high-resolution bilevel value formation processing;

FIG. 23 is a diagram showing results of high-resolution bilevel value formation processing with respect to an original including fine lines;

FIG. 24 is a diagram showing results of image processing by corrected coefficient ROM data;

FIG. 28 is an explanatory diagram showing the results of processing by the said modification of the second embodiment.

DESCRIPTION OF THE PREFERRED EMBODIMENTS

Figure 1:
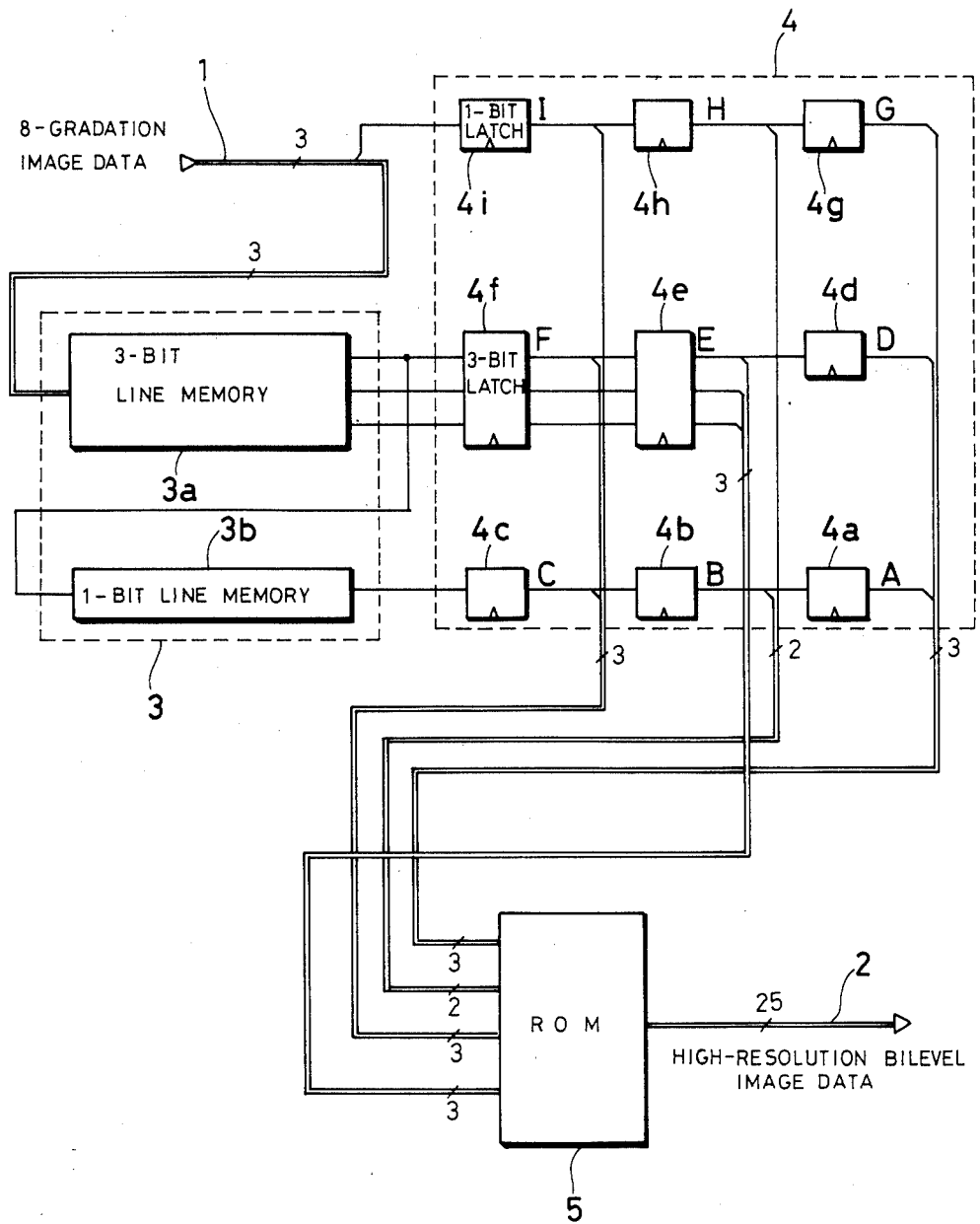
FIG. 1 is a block diagram showing a first embodiment of the present invention.

FIG. 1 is a block diagram showing a first embodiment of a high-resolution bilevel image data generating apparatus according to the present invention. An input end 1 receives image data obtained by reading a bilevel original (e.g., black-and-white original; this embodiment is hereafter described with respect to a black-and-white original.) in a multi-gradation manner with a scanning line range of, e.g., 400 lines/inch (resolution of 63.5 μm square) while an output end 2 outputs bilevel image data higher in resolution than the inputted multi-gradation image data. When, for example, black and white coexist in pixels read from the original, or the area of solid black in a black line original is so small that its density is insufficient, the data have intermediate density values. In the following description, the term "pixels" simply indicates those in original reading resolution, and those to be outputted in higher resolution are referred to as "high-resolution pixels".

When, for example, a CCD scanner is employed for reading an original, the read image is stored in respective cells of the CCD element in the form of analog charges, to be converted into voltage or current values. Thus, the read image is obtained in the form of multi gradation level signals. Also, in case of a photomechanical process scanner, the amount of light of the read image is converted into analog current values by a photomultiplier. Thus, both of the input devices read the originals as variable-density images in the stages of light receiving elements, and are applicable to the present invention. The gradation range of the image data supplied to the input end 1 may be arbitrarily selected, while the following description is made on the case where eight-gradation (three-bit) image data are inputted.

Data on respective pixels (three bits each) of the eight-gradation image data supplied through the input end 1 are sequentially stored in a line memory device 3 under timing control by a timing control means (not shown) while pixels to be processed are fetched from the input end 1 and the line memory device 3 in forms required for processing, are sequentially stored in a latch circuit 4. The line memory device 3 is formed by a three-bit line memory 3a for storing the inputted eight-gradation image data in eight gradation levels by one line and a one-bit line memory 3b for storing only the most significant bit of the image data stored in the three-bit line memory 3a by one line, which memories 3a and 3d are connected in series sequentially from the input end 1. The one-bit line memory 3b is adapted to store only the most significant bit of the input image data, so that the input data of eight gradation levels are converted into bilevel values at a threshold value S=4.

The latch circuit 4 is formed by one-bit latches 4c, 4b and 4a connected in series sequentially from the output end of the one-bit line memory 3b, three-bit latches 4f and 4e and one-bit latch 4d in series sequentially from the output end of the three-bit line memory 3a and one-bit latches 4i, 4h and 4g connected in series sequentially from the input end 1. The one-bit latch 4d is so connected as to receive only the most significant bit of three-bit pixel data stored in the three-bit latch 4e and the one-bit latches 4i, 4h and 4g are so connected as to receive only the most significant bit of a train of three-bit pixel data supplied from the input end 1.

Thereby, image data in a 3 by 3 pixel region of the input image are sequentially read from the latch circuit 4 through an appropriate timing control. At this time, pixel data stored in the one-bit latches 4a to 4d and 4g to 4i are converted into bilevel values at the threshold value S=4. The three-bit pixel data stored in the three-bit latch 4f are also converted to bilevel values at the threshold values S=4 by transferring only the most significant bit to a ROM 5 provided in a subsequent stage.

The data comprising a total of 11 bits thus read with respect to an eight-gradation (three-bit) central pixel E and bilevel (one-bit) peripheral pixels A, B, C, D, F, G, H and I are supplied as an address to the ROM 5. The as an address represents combinations of the gradation value of the central pixel E in the 3 by 3 pixel region of the input image and data patterns of the peripheral pixels, while the ROM 5 previously stores bilevel image pattern data (e.g., 5 by 5 high-resolved pixel data) higher in resolution than the input image (in resolution of 63.4 μm square corresponding to the scanning line number of 400 lines/inch in the aforementioned case) corresponding to each combination (i.e., each address). In response to the supplied address input, the ROM 5 reads out bilevel image pattern data stored in the address on the output end 2.

Figure 2:
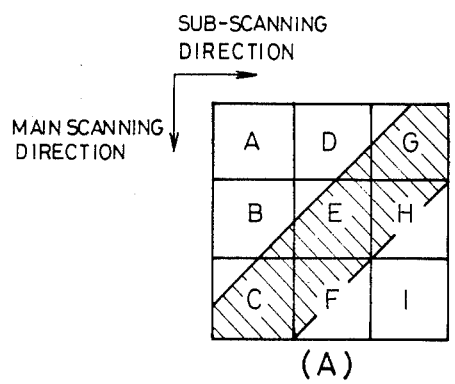
Figure 3:
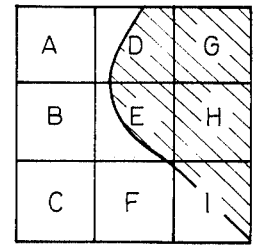

With reference to FIGS. 2 and 3, a brief description is given on the procedure for the aforementioned processing.

(Step 1): First, bilevel originals (only 3 by 3 pixels are shown in the figures) as shown at (A) are read as eight-gradation image data, to be stored as 3×3 pixels in the latch circuit 4 as shown at (B).

(Step 2): Then peripheral pixels A to D and F to I are bilevel-imaged by threshold values previously set at four, with "1" when data>4 and "0" when data<4, as shown at (C).

(Step 3): High-resolution pattern data for central pixel E are read from the ROM 5 as shown at (D), in response to combinations of gradation values of the central pixel E and data patterns of the peripheral pixels A to D and F to I.

Figure 4A:
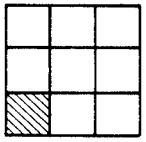
Figure 4A:
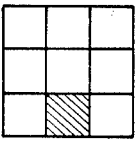
Figure 4A:
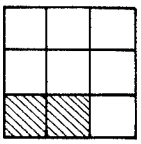
Figure 4A:
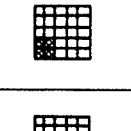
Figure 4A:
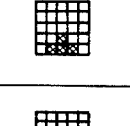
Figure 4A:
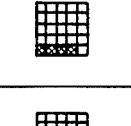
Figure 4A:
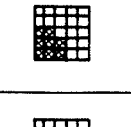
Figure 4A:
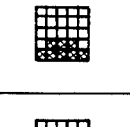
Figure 4A:
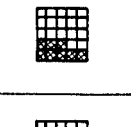
Figure 4A:
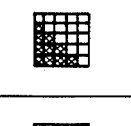
Figure 4A:
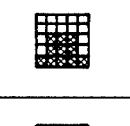
Figure 4A:
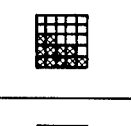
Figure 4A:
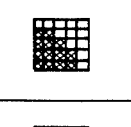
Figure 4A:
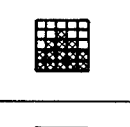
Figure 4A:
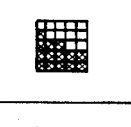
Figure 4A:
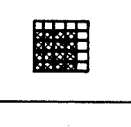
Figure 4A:
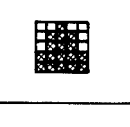
Figure 4A:
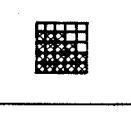
Figure 4A:
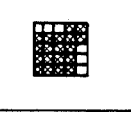
Figure 4A:
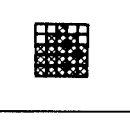
Figure 4A:
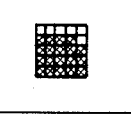
Figure 4A:
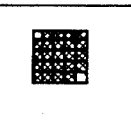
Figure 4A:
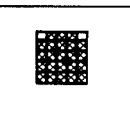
Figure 4A:
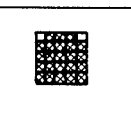
Figure 4B:
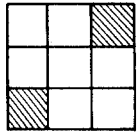
Figure 4B:
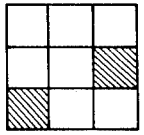
Figure 4B:
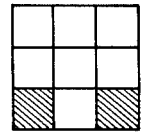
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4B:
Figure 4C:
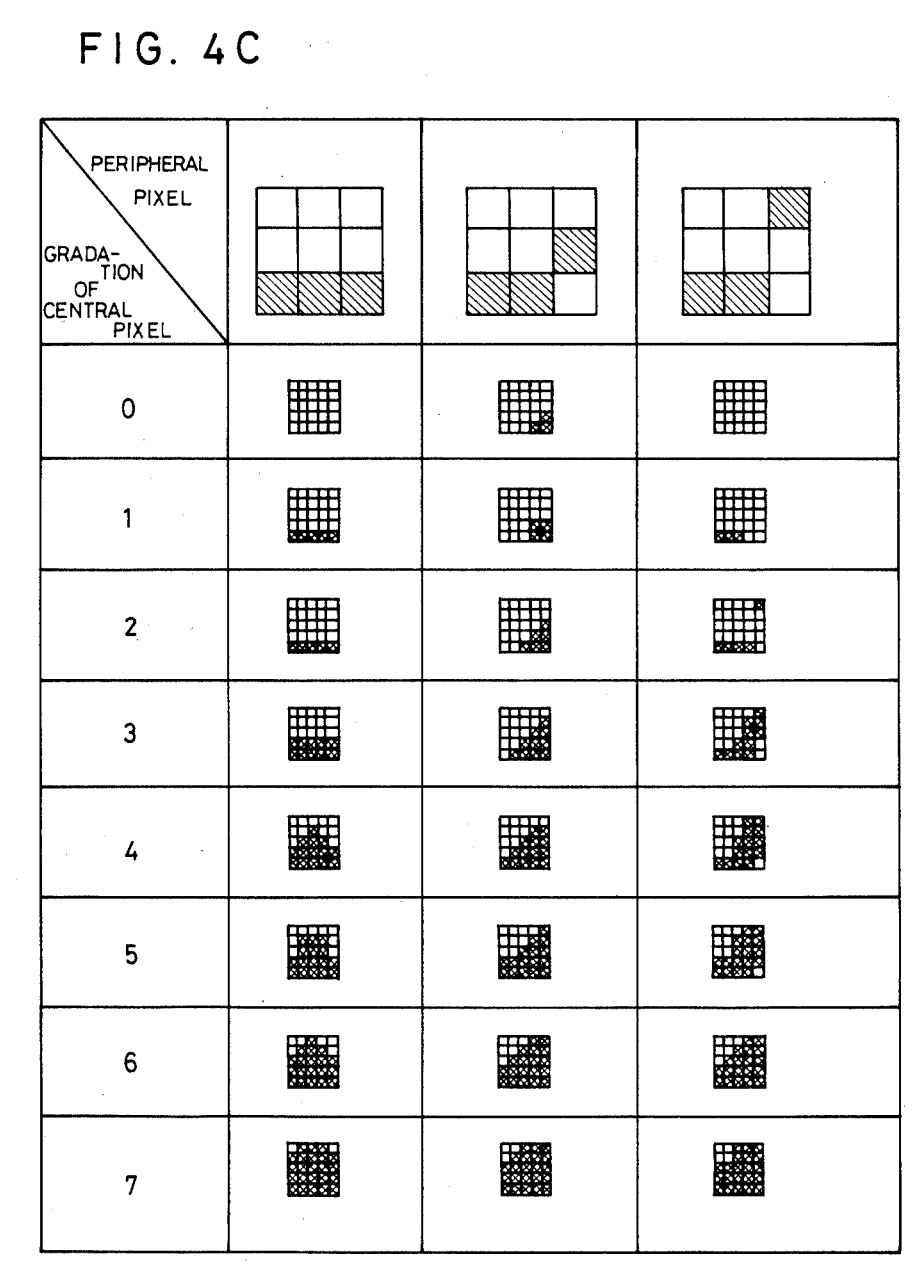

The high-resolution pattern data may be obtained by a calculator through an appropriate algorithm for each of the combinations of the gradation values of the central pixel and the data patterns of the peripheral pixels, or the respective data may be artificially obtained to make edge portions as smooth as possible. FIGS. 4A to 4C show examples high-resolution pattern data artificially obtained by dividing each pixel of an input image into 5 by 5 dots. In this case, the capacity required for the ROM 5 is;

$$2^8 \times 8 \times 25 \approx 51 \text{ Kbits}$$

In the left side of the above expression, the first term represents the number of all data patterns of the peripheral pixels, the second term represents the gradation level number of the central pixel and the third term represents the dot number (divider for dividing each pixel to store the same) of high-resolution bilevel image data.

In order to highly resolve an image in a more dense and rational manner, the amount of information must be increased. In other words, it is necessary to increase (1) the gradient of the input image or (2) the gradients of the peripheral pixels in the image region to be processed. FIGS. 5 and 6 show examples of peripheral pixels in 3 pixel regions, which peripheral pixels are provided with gradients of four gradation levels (input image is with eight gradation levels similarly to the above case) in order to correctly recognize lines thinner than the read pixels. In this case, capacity required for the ROM 5 is;

$$4^8 \times 8 \times 25 \approx 13 \text{ Mbits}$$

In order to carry out the method as shown in FIGS. 5 and 6, modifications may be applied to the embodiment as shown in FIG. 1. In other words, it is necessary (1) to enable the latches 4a to 4d and 4g to 4i of the latch circuit 4 and the line memory 3b to store two high-order bits of the image data; (2) to supply the peripheral pixels A to D and F to I to the ROM 5 in the from of two-bit data; and (3) to increase capacity of the ROM 5 for storing high-resolution pattern data in response to the increments in the input data supplied to the ROM 5.

In order to obtain high-resolution pattern data, in general, on the basis of high order bits $n_A$, $n_B$, $n_C$, $n_D$, $n_F$, $n_G$, $n_H$ and $n_I$ of peripheral pixels A, B, C, D, F, G, H and I with respect to m-bit pixels of input image data, it is necessary (1) to provide the line memory 3a with a bit length of m bits and form the latches 4f and 4e by m-bit ones; (2) to increase the latches 4a to 4d and 4g to 4i for storing the peripheral pixels in bit number and the line memory 3b in bit length responsively to $n_A$ to $n_D$ and $n_G$ to $n_I$; and (3) to increase the capacity of the ROM 5 in response to increments in input data supplied therein. The bit numbers $n_A$ to $n_D$ and $n_G$ to $n_I$ of the peripheral pixel data may not necessarily be equal to each other. The bit numbers may be appropriately selected in response to characteristics of the image to be processed, for example, as follows;

$n_A = n_C = n_G = n_I =$ one bit $n_B = n_D = n_F = n_H =$ two bits

Figure 7:
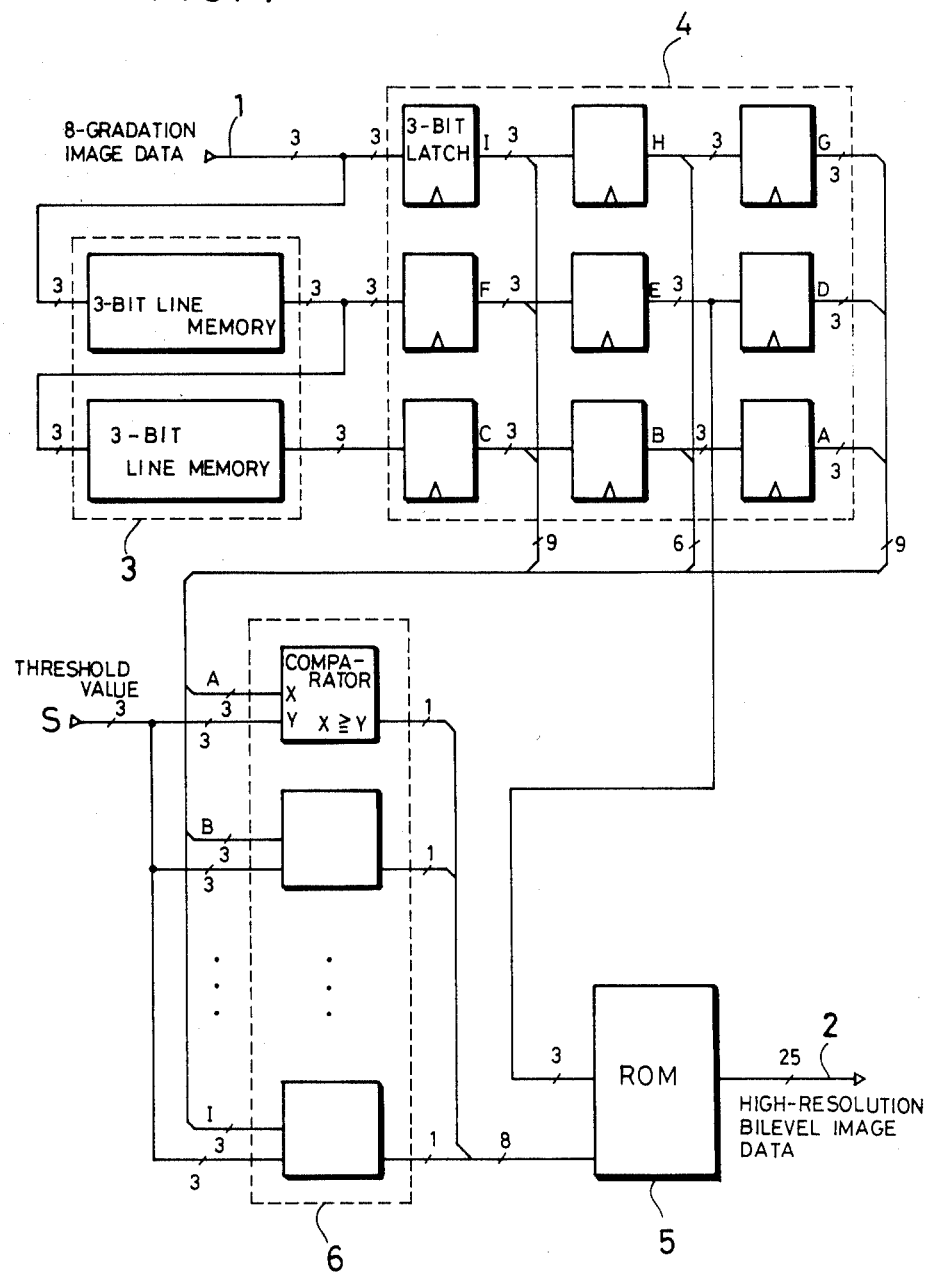
FIGS. 7 and 8 are block diagrams showing modifications of the first embodiment of the present invention.

FIG. 7 is a block diagram showing a modification of the first embodiment of the present invention as hereinabove described. This modification is so structured that a desired number can be selected as a threshold value S for converting into bilevel values peripheral pixels A to D and F to I. Therefore, the line memory device 3 and the latch circuit 4 are so increased in bit number as to directly store all of the pixels of an eight-gradation input image, while a comparing circuit 6 formed by eight comparators are further included as means for converting into bilevel values the peripheral pixels A to D and F to I at a desired threshold value S. The respective comparators of the comparing circuit 6 are supplied to input terminals X thereof with respective three-bit data of the peripheral pixels A to D and F to I, while the other input terminals Y thereof are provided with an appropriately selected three-bit threshold value S. The respective comparators compare the X and Y input data, to output "1" when X≧Y and "0" when X<Y. Similarly to the case of FIG. 1, three-bit data on an eight-gradation central pixel E and data of eight bits in total on the bilevel peripheral pixels A to D and F to I are supplied to the address input terminal of the ROM 5 storing high-resolution bilevel pattern data, so that high-resolution bilevel pattern data are read from the ROM 5 in a manner similar to the above.

According to the structure as shown in FIG. 7, the threshold value S can be so reduced that no information on fine lines (small in average gradation value) in the said peripheral pixels is erased from multi-gradation peripheral pixel data to be converted to bilevel values in order to process, e.g., an original formed by extremely fine lines with decreased average density of a read region, therby to further improve reliability in high-resolution operation.

Figure 8:
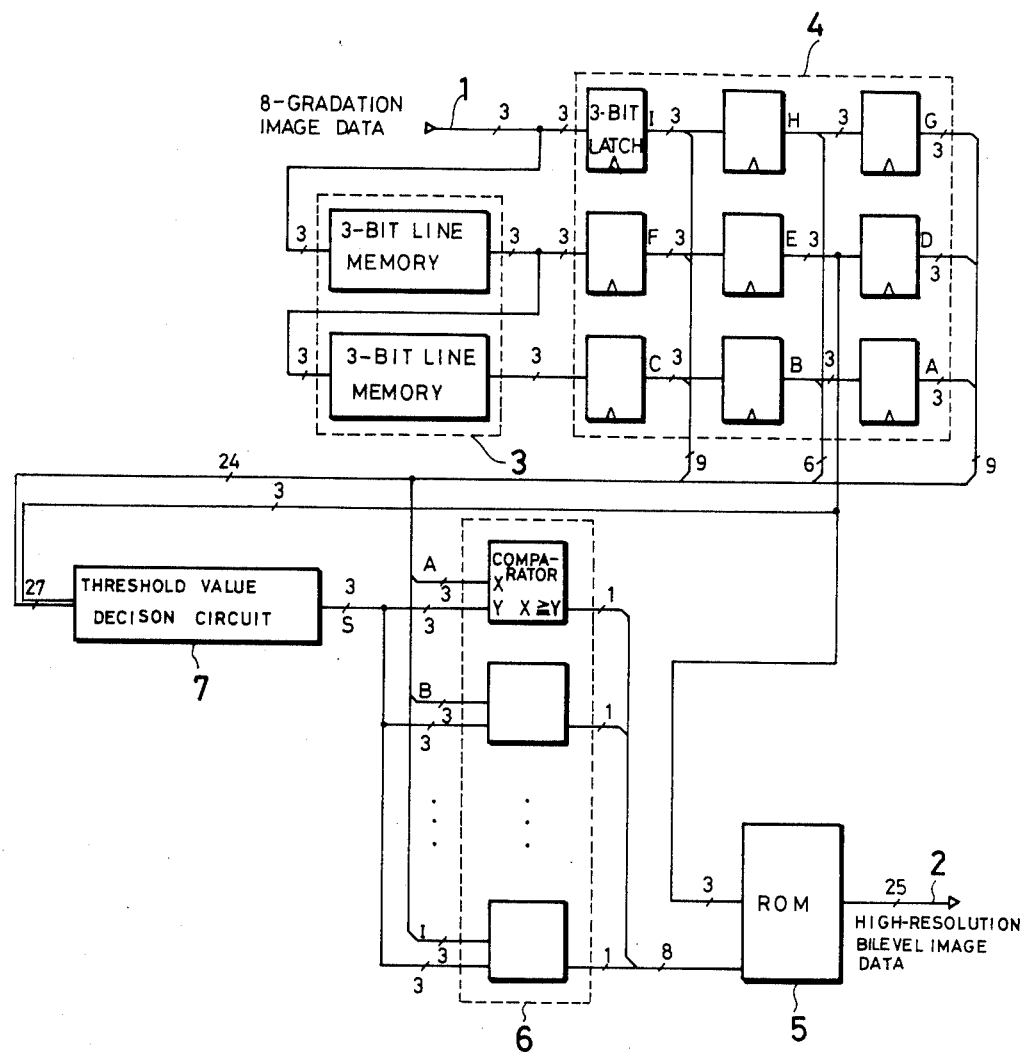
Figure 9:
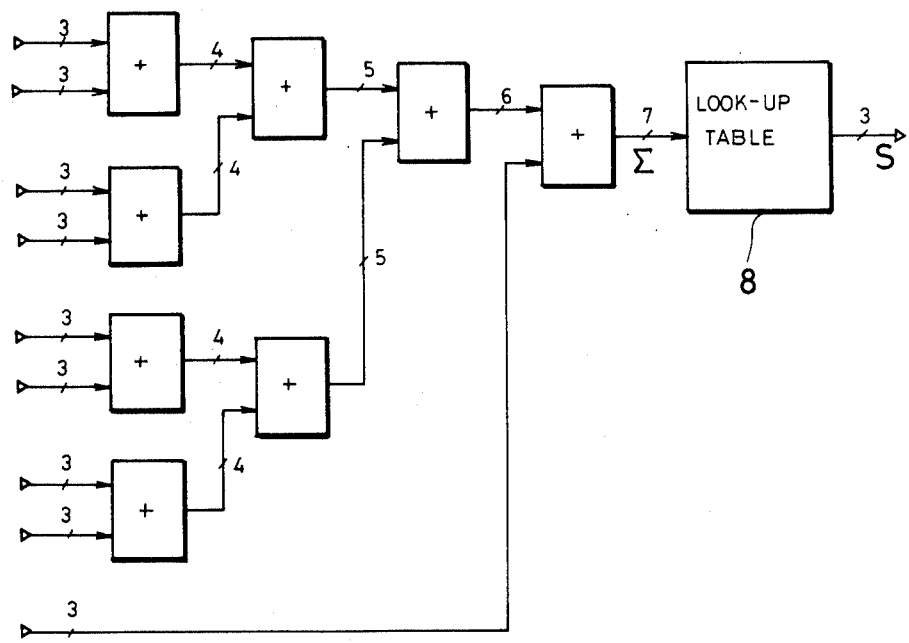
FIG. 9 is a block diagram showing an example of a threshold value determining circuit.

FIG. 8 is a block diagram showing another modification of the first embodiment. This modification is so structured that the threshold value S in the modification of FIG. 7 is automatically determined in accordance with algorithms previously set in response to an input image. Therefore, a threshold value decision circuit 7 is provided to receive image data of 27 bits in total from nine three-bit latches of a latch circuit 4, to be supplied with image information on a 3 by 3 pixel region of the input image. FIG. 9 shows an exemplary construction of the threshold value decision circuit 7, which obtains the total sum of the respective three-bit pixel data as received, to calculate the area of a black (solid) portion in the 3 by 3 pixel region. In response to the calculated area of the black (solid) portion, the threshold value deciding circuit 7 reads a three-bit threshold value S previously stored in a look-up table 8, to supply the threshold value S to eight comparators provided in a comparing circuit 6. Thus, the area of the black (solid) portion is reduced in, e.g., an original formed by fine lines, whereby the threshold value S can be automatically reduced.

Figure 10:
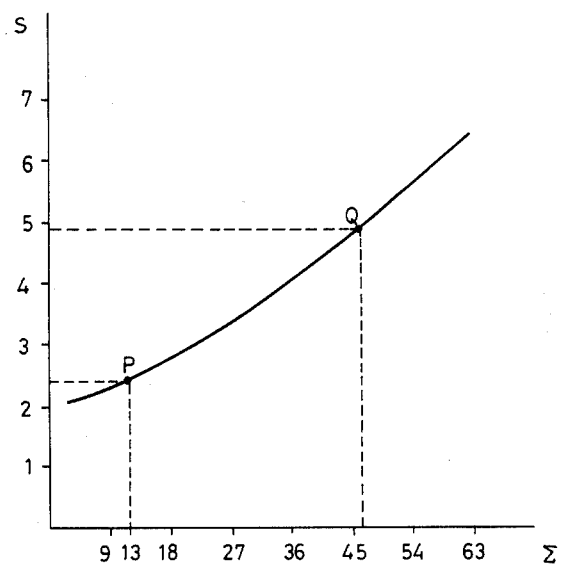
FIG. 10 illustrates examples of threshold values previously stored in a look-up table as shown in FIG. 9.

FIG. 10 is a graph showing examples of threshold values S to be previously stored in the look-up table 8 as shown in FIG. 9. The data in this look-up table 8 are adapted to process bilevel images as shown at FIGS. 11(A) and 12(A). FIGS. 11(B) and 12(B) show gradation values thereof respectively. Sums Σ are obtained from the gradation values through the circuit of FIG. 9, as follows;

FIG. 11: Σ = 13

FIG. 12: Σ = 47.

These sums refer to points P and Q in FIG. 10 respectively, and the threshold values S outputted from the look-up table 8 are as follows;

FIG. 11: 24

FIG. 12: 49.

With respect to these threshold values S, the peripheral image at FIGS. 11(B) and 12(B) is converted to bilevel values as shown at FIGS. 11(C) and 12(C). Comparing FIGS. 11(C) and 12(C) with FIGS. 5(C) and 6(C), the former peripheral bilevel image more sufficiently expresses directivity of high-resolution data of the central pixel. The method as shown in FIGS. 5 and 6 requires about 13 Mbits as the capacity of the ROM 5, while the modifications of FIGS. 8 and 9 can attain effects similar to that of FIGS. 5 and 6 with the same ROM capacity (about 51 Kbits) as that in embodiment as shown in FIG. 1, to realize high resolution operation with correct recognition of lines thinner than the pixel width.

Figure 13:
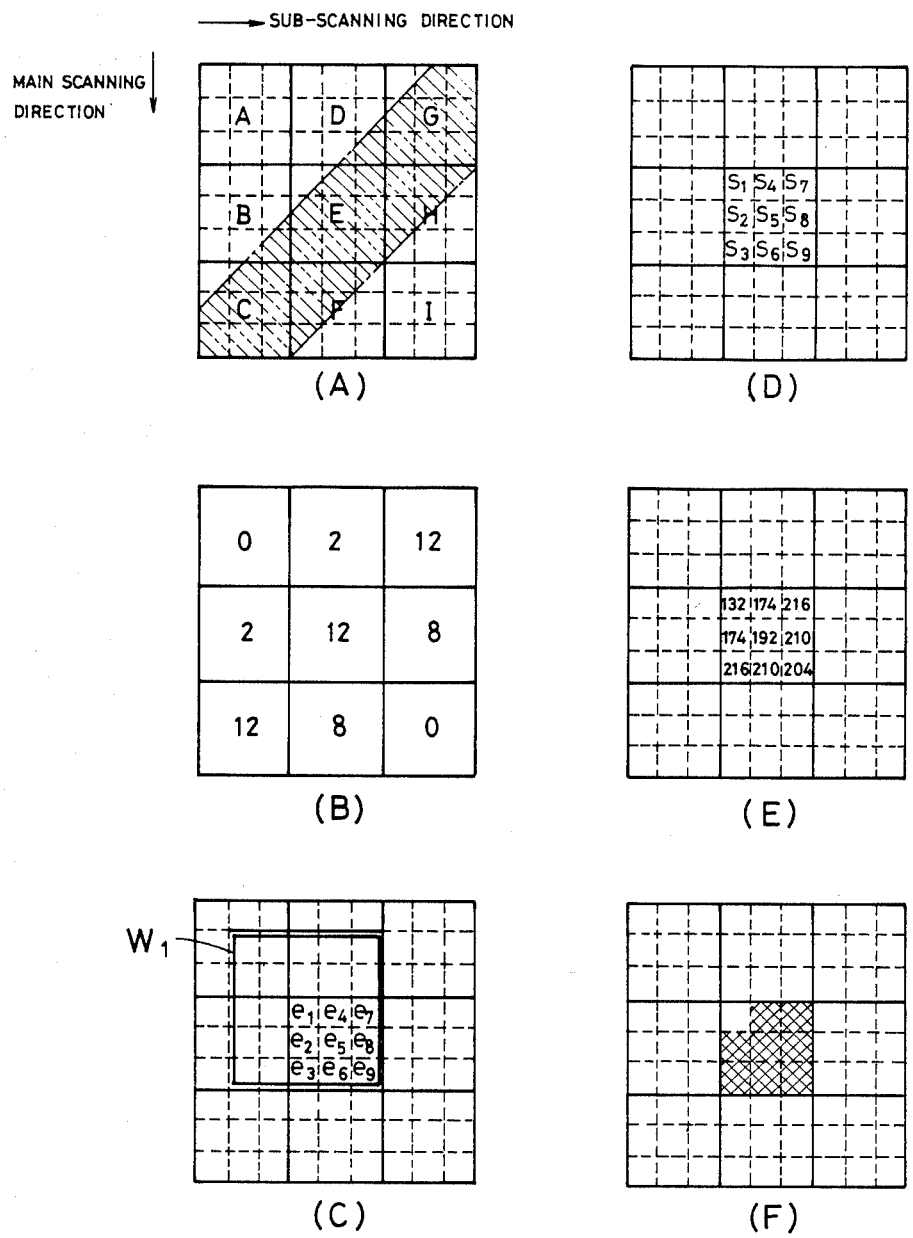
FIG. 13 is a diagram showing a procedure for carrying out image processing in accordance with a second embodiment of the present invention.

Description is now made of a second embodiment of the present invention. First, the image processing procedure in the second embodiment is schematically described with reference to FIG. 13. The above description of the first embodiment has been made based on a bilevel original in the form of an eight-gradation image, while the second embodiment is adapted to read an original in the form of a 16-gradation image.

(Step 1): A bilevel original (only 3 by 3 pixels are shown in the figure) as shown at FIG. 13(A) is read as, e.g., 16-gradation image data, to detect pixels by a prescribed image processing region around a pixel E (hereinafter referred to as a central pixel) to be processed as shown at FIG. 13(B), in which 3 by 3 pixels are detected. High-resolution processing is performed on the central pixel E, through use of image data on peripheral pixels A, B, C, D, F, G, H and I.

(Step 2): Consider the case of highly resolving the read image data by, e.g., three times. In this case, for example, a logic window $W_1$ for, e.g., 5 by 5 high-resolution pixels is assumed about a high-resolution pixel $e_1$ within high-resolution pixels $e_1$ to $e_g$ as shown at FIG. 13(C) obtained by subdividing the central pixel E into 3 by 3 pixels, to obtain a density sum $s_1$ of input image data in the logic window $W_1$. The density sum $s_1$ may be obtained by adding density values of the pixels A, B, D and E overlapping the logic window $W_1$ in response to areas of the overlapping portions in the case of FIG. 13(C). For example, density values of corresponding input image data as shown at FIG. 13(B) may be added per high-resolution pixel in the logic window $W_1$. The following expression represents an example of a calculation of $s_1$ in the case as shown in the figure:

$$s_1 = 4 \times 0 + 6 \times 2 + 6 \times 2 + 9 \times 12 = 132 \tag{1}$$

For example, the first term $4 \times 0$ in the right side of the above expression represents that four high-resolution pixels are present in the logic window $W_1$ to overlap the pixel A having a density value of zero. Similarly, the second, third and fourth terms in the right side are for the pixels B, D and E respectively. The size of the logic window $W_1$ may be selected to be within the prescribed image region (3 by 3 pixels in this case) detected in Step 1. For example, the logic window $W_1$ may have a size of 3 by 3 high-resolution pixels or 7 by 7 high-resolution pixels.

(Step 3): Processing similar to that of the procedure 2 is performed with respect to the other high-resolution pixels $e_2$ to $e_g$ in the central pixel E, to obtain density sums $s_2$ to $s_9$ corresponding to respective logic windows $W_2$ to $W_9$ (not shown) identical in size to the logic window $W_1$, as shown at FIG. 13(D):

$$s_2 = 2 \times 0 + 6 \times 2 + 2 \times 12 + 3 \times 2 + 9 \times 12 + 3 \times 8 = 174 \tag{2}$$

$$s_3 = 6 \times 2 + 4 \times 12 + 9 \times 12 + 6 \times 8 = 216 \tag{3}$$

$$s_4 = 2 \times 0 + 3 \times 2 + 6 \times 2 + 9 \times 12 + 2 \times 12 + 3 \times 8 = 174 \tag{4}$$

$$s_5 = 1 \times 0 + 3 \times 2 + 1 \times 12 + 3 \times 2 + 9 \times 12 + 3 \times 8 + 1 \times 12 + 3 \times 8 + 1 \times 0 = 192 \tag{5}$$

$$s_6 = 3 \times 2 + 2 \times 12 + 9 \times 12 + 6 \times 8 + 3 \times 8 + 2 \times 0 = 210 \tag{6}$$

$$s_7 = 6 \times 2 + 9 \times 12 + 4 \times 12 + 6 \times 8 = 216 \tag{7}$$

$$s_8 = 3 \times 2 + 9 \times 12 + 3 \times 8 + 2 \times 12 + 6 \times 8 + 2 \times 0 = 210 \tag{8}$$

$$s_9 = 9 \times 12 + 6 \times 8 + 6 \times 8 + 4 \times 0 = 204 \tag{9}$$

FIG. 13(E) shows the results of the above operations.

(Step 4): The total sum S of the density values of the image data for 3 by 3 pixels as shown at FIG. 13(B) is obtained to read a threshold value SL previously set in correspondence to S from, e.g., a look-up table. In the case of FIG. 13(B), the sum S is as follows:

$$S = 0 + 2 + 12 + 2 + 12 + 8 + 12 + 8 + 0 = 56 \tag{10}$$

It is assumed that SL is equal to, e.g., 150 in this case.

(Step 5): The threshold value SL is compared with $s_j (j = 1$ to $9)$ to convert to bilevel values the high-resolved pixels $e_1$ to $e_9$ on the condition that:

$$\text{if } s_j > SL, \text{ then } e_j = \text{"1"} \tag{11}$$

$$\text{if } s_j \leq SL, \text{ then } e_j = \text{"0"} \tag{12}$$

thereby to obtain high resolution bilevel image data with respect to the central pixel E. FIG. 13(F) shows the results of this processing. The said processing is performed on all of the pixels of the image, to obtain bilevel image data by highly resolving the input image data by 3 by 3 times.

Figure 14:
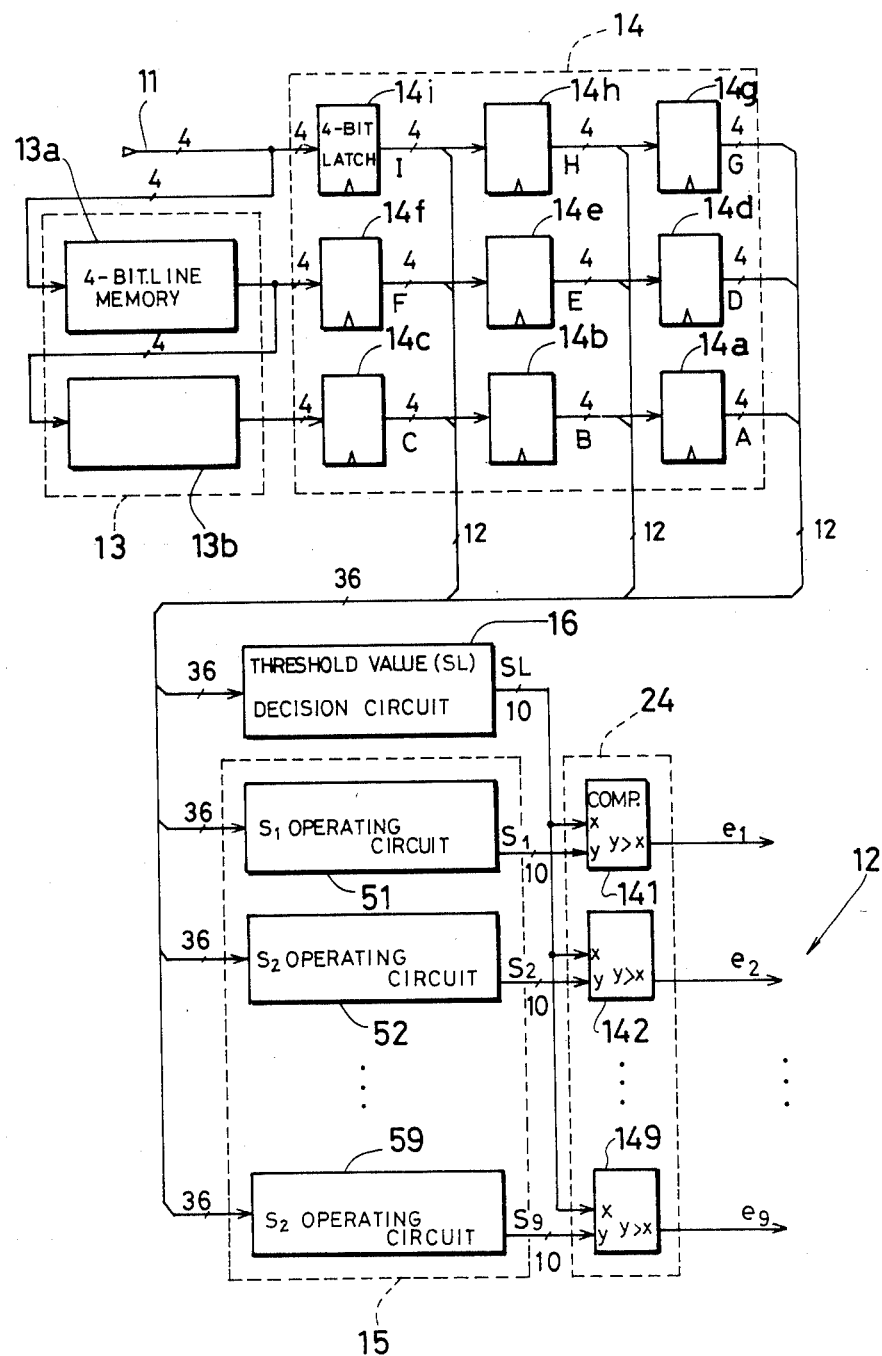
FIG. 14 is a block diagram showing the second embodiment of the present invention.

FIG. 14 is a block diagram showing a high-resolution bilevel image data generating apparatus according to the second embodiment of the present invention for implementing the aforementioned processing. An input end 11 receives image data obtained by reading a bilevel original (e.g., black-and-white original; The following description is made on a black-and-white original.) in a multi-gradation manner (16 gradation levels in this embodiment) with a scanning line number of, e.g., 400 lines/inch (resolution of 63.5 $\mu$m square), while an output end 12 outputs bilevel image data higher in resolution than the inputted multi-gradation image data.

Data on respective four-bit pixels of the 16-gradation image data inputted from the input end 11 are sequentially stored in a line memory device 13 under timing control by a timing control means (not shown), while the pixels to be processed are read from the input end 11 and the line memory device 13 to be sequentially stored in a latch circuit 14. The line memory device 13 is formed by two four-bit line memories 13a and 13b for storing the inputted 16-gradation image data respectively by one line, which line memories 13a and 13b are connected in series sequentially from the input end 11. The latch circuit 14 includes nine four-bit latches 14a to 14i, in which the four-bit latches 14i, 14h and 14g are connected in series sequentially from the input end 11 and the four-bit latches 14f, 14e and 14d are connected in series sequentially from the output end of the four-bit line memory 13a while the four-bit latches 14c, 14b and 14a are connected in series sequentially from the output end of the four-bit line memory 13b.

Thereby, image data in a 3 by 3 pixel region of the input image are sequentially read in the latch circuit 14 through an appropriate timing control. Assuming that the image is read in the main and sub scanning directions as shown by arrows in FIG. 13(A), respective pixels A to I in the 3 by 3 region are read in the latch circuit 14 in accordance with positional relations of right-downward subscripts A to I in respective four-bit latches 14a to 14i as shown in FIG. 14. The above processing corresponds to the aforementioned procedure 1.

The image data (36 bits in total) for all of the pixels A to I in the 3 by 3 region thus read are supplied to respective $s_1$ to $s_9$ operating circuits 51 to 59 in a density sum operating circuit 15 and a threshold value (SL) decision circuit 16. As hereinafter described, the density sum operating circuit 15 performs processing corresponding to the procedure 2 and 3, while the threshold value decision circuit 16 performs processing corresponding to the procedure 4.

Figure 15:
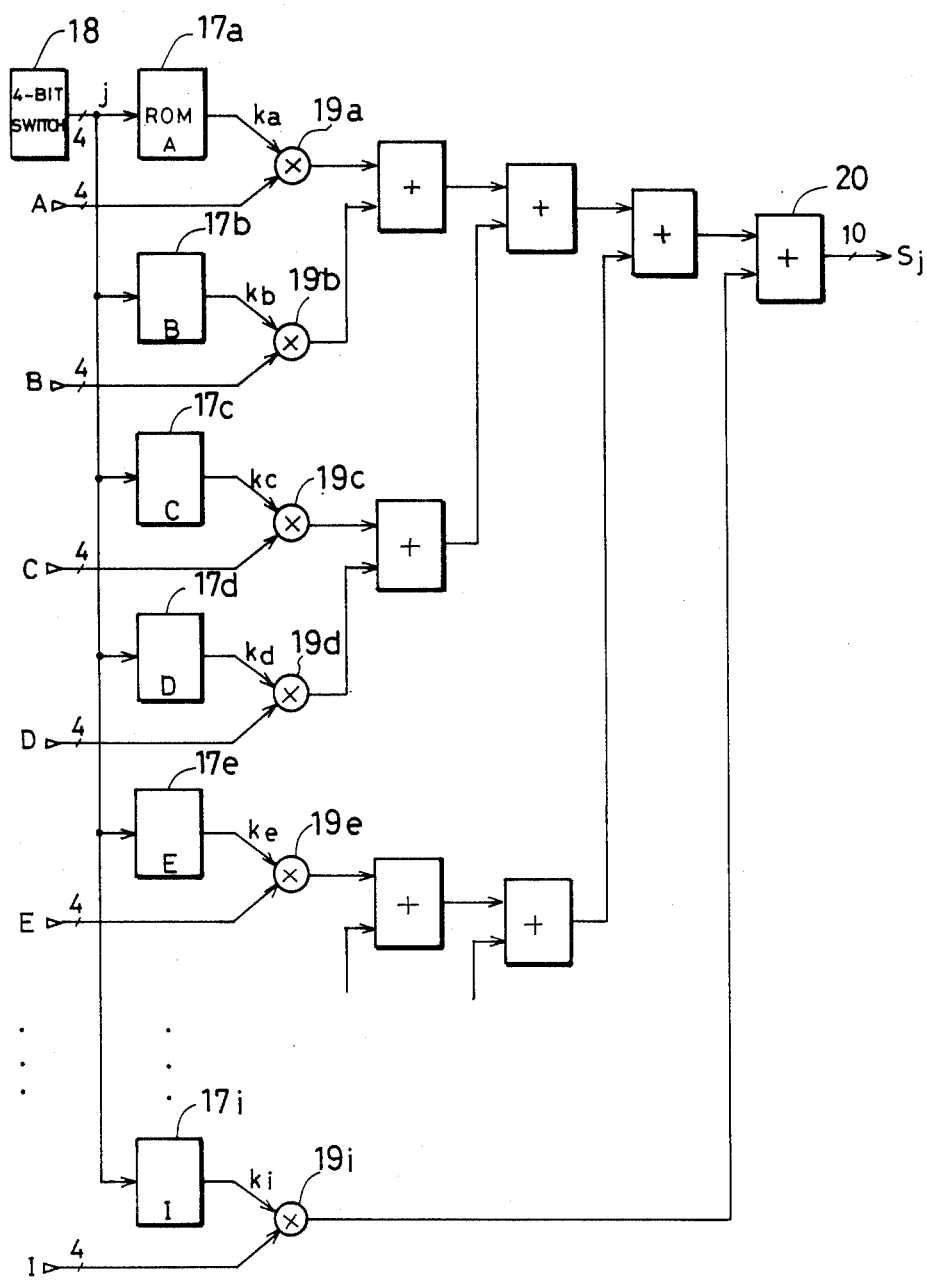
FIG. 15 is a block diagram showing an exemplary construction of a density sum operating circuit.

FIG. 15 is a block diagram showing an exemplary circuit structure of the density sum operating circuit 15. The density sum operating circuit 15 includes nine coefficient ROMs 17a to 17i respectively corresponding to the pixels A to I in the 3 by 3 region. Assuming that there are provided logic windows $W_1$ to $W_9$ of prescribed size around high-resolution pixels $e_1$ to $e_9$, the coefficient ROMs 17a to 17i output numbers of high-resolution pixels contained in the logic windows $W_1$ to $W_9$ for the respective corresponding pixels A to I. These output values are indicated by symbols $k_a$ to $k_i$ in FIG. 15. Four-bit selection signals j supplied to the coefficient ROMs 17a to 17i through a four-bit switch 18 determine which values are to be outputted with respect to the logic windows $W_1$ to $W_9$. For example, j=1 to 9 in decimal number correspond to selection of the logic windows $W_1$ to $W_9$ respectively.

When, for example, j=1, the coefficient ROMs 17a to 17i output values with respect to the logic window $W_1$ as shown at FIG. 13(C). Numbers of the high-resolved pixels in the logic window $W_1$ with respect to the pixels A to I are 4, 6, 0, 6, 9, 0, 0, 0 and 0 respectively, and hence the coefficient ROMs 17a to 17i output values 4, 6, 0, 6, 9, 0, 0, 0 and 0 respectively. In other words, if j=1, then $k_a=4$, $k_b=6$, $k_c=0$, $k_d=6$, $k_e=9$, $k_f=0$, $k_g=0$, $k_h=0$ and $k_i=0$. Table 1 shows output values of the coefficient ROMs with respect to all of the numbers j.

TABLE 1

| k | j | | | | | | | | |
|---|---|---|---|---|---|---|---|---|---|
|   | 1 | 2 | 3 | 4 | 5 | 6 | 7 | 8 | 9 |
| $K_a$ | 4 | 2 | 0 | 2 | 1 | 0 | 0 | 0 | 0 |
| $K_b$ | 6 | 6 | 6 | 3 | 3 | 3 | 0 | 0 | 0 |
| $K_c$ | 0 | 2 | 4 | 0 | 1 | 2 | 0 | 0 | 0 |
| $K_d$ | 6 | 3 | 0 | 6 | 3 | 0 | 6 | 3 | 0 |
| $K_e$ | 9 | 9 | 9 | 9 | 9 | 9 | 9 | 9 | 9 |
| $K_f$ | 0 | 3 | 6 | 0 | 3 | 6 | 0 | 3 | 6 |
| $K_g$ | 0 | 0 | 0 | 2 | 1 | 0 | 4 | 2 | 0 |
| $K_h$ | 0 | 0 | 0 | 3 | 3 | 3 | 6 | 6 | 6 |
| $K_i$ | 0 | 0 | 0 | 0 | 1 | 2 | 0 | 2 | 4 |

The respective coefficient ROMs 17a to 17i store all of the data as shown in Table 1, so as to set input addresses k indicating which ones of the coefficient ROMs 17a to 17i are employed and input addresses J indicating which numbers j are employed to output the coefficients. in FIG. 15, the input addresses K are independently set in the respective coefficient ROMs 17a to 17i, and the input addresses J are address-designated by the four-bit selection signals j supplied through the four-bit switch 18 as hereinabove described.

Figure 16:
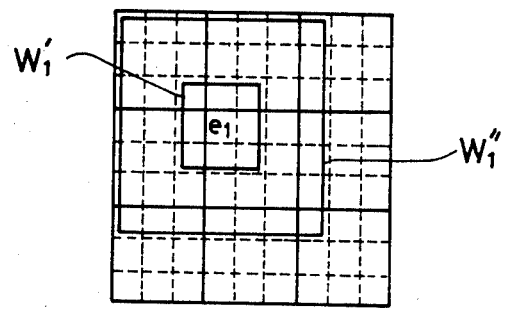
FIG. 16 is a diagram of a logic window.
Figure 17:
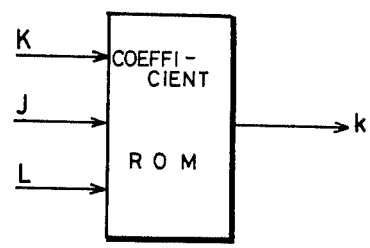
FIG. 17 is a schematic diagram showing a coefficient ROM.

The logic windows $W_1$ to $W_9$ are provided respectively for 5 by 5 high-resolution pixels in size in the case of Table 1, while the said size can be modified to that for 3 by 3 high-resolution pixels or 7 by 7 high-resolution pixels as shown by $W_1'$ or $W_1''$ in FIG. 16. In this case, only the respective coefficients in Table 1 may be reloaded, and the circuit structure as shown in FIG. 15 itself may not be modified. The respective coefficient ROMs 17a to 17i may be further provided with input addresses L showing the forms of the logic windows, which input addresses L may appropriately be set by commands from a CPU (not shown) to arbitrarily change the logic window forms. As a matter of course, the respective coefficient ROMs 17a to 17i must previously store coefficient values corresponding to the various froms of logic windows. FIG. 17 shows the internal structure of each coefficient windows in this case.

The output values $k_a$ to $k_i$ of the coefficient ROMs 17a to 17i shown in FIG. 15 thus obtained are supplied to respective one input terminals of multipliers 19a to 19i. The other input terminals of the multipliers 19a to 19i are respectively supplied with image data representing gradients (density values) of the pixels A to I. Therefore, the multipliers 19a to 19i multiply the density values of the pixels A to I by coefficients responsive to the logic window forms. The multiplied results are sequentially added up by a plurality of stages of adders, whereby the total sum $s_j$ as the result is derived from an adder 20 of the final stage. When j=1, the expression (1) in the procedure 2 is calculated. When j=2 to 9, the expressions (2) to (9) are calculated.

Referring to FIG. 15, the total sum $s_j$ outputted from the adder 20 of the final stage has bit length of 10 bits on such assumption that all of the gradients of the pixels A to I are 15 (maximum value in four bits) and the logic windows are at the maximum possible size (7 by 7 high-resolved pixels). When the bit numbers of the pixels, the degree of high resolution and the size of the logic windows are changed, the bit length of $s_j$ must be correspondingly changed as a matter of course.

Figure 18:
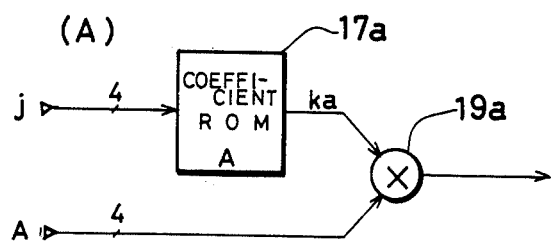
FIG. 18 shows an exemplary construction utilizing a look-up table.
Figure 18:
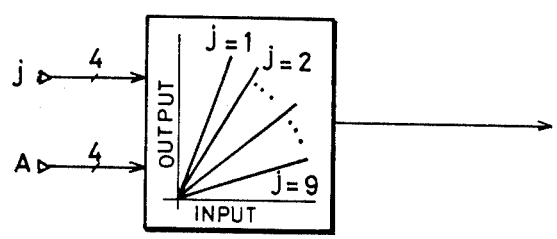

Each of the coefficient ROMs 17a to 17i and the multipliers 19a to 19i can be replaced by one look-up table (either ROM or RAM). FIG. 18 shows the manner of such replacement. For example, a portion as shown at FIG. 18(A) can be replaced by the structure as shown at FIG. 19(B). A look-up table 21 as shown at FIG. 18(B) stores nine coefficient tables corresponding to j=1 to 9, which tables store the results of multiplication (output) corresponding to the value of input A respectively. With such a structure, a circuit can be implemented at a low cost without employing high-priced multipliers.

Figure 19:
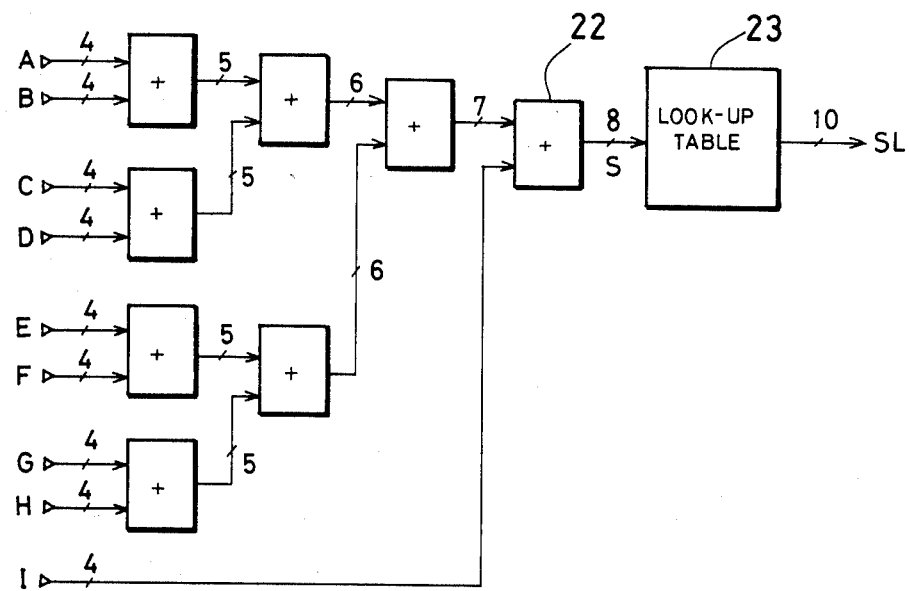
FIG. 19 is a block diagram showing an exemplary construction of a threshold value deciding circuit.

The threshold value decision circuit 16 as shown in FIG. 14 performs processing corresponding to the aforementioned procedure 4. FIG. 19 is a block diagram showing the threshold value decision circuit 16 in detail. As shown in FIG. 19, the inputted image data on the pixels A to I are sequentially added by four stages of adders, whereby an adder 22 of the final stage outputs the sum S as the result. This processing corresponds to the calculation of the expression (10). The sum S thus obtained is inputted to a look-up table 23, which in turn derives an optimum threshold value SL responsive to the value S.

Figure 20:
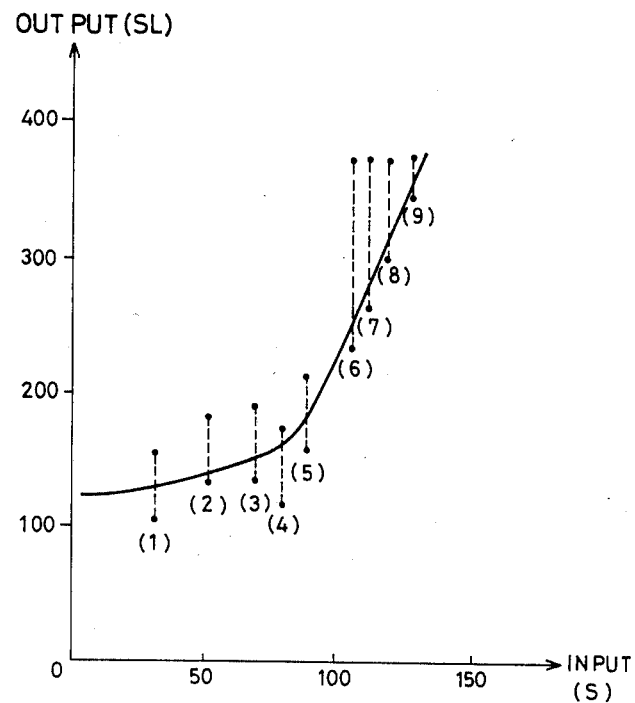
FIG. 20 is a diagram showing an example of decision of threshold values.

Stored in the look-up table 23 are previously determined contents, examples of which are shown by the solid line in FIG. 20. The table data correspond to the conditions of this second embodiment, i.e., (1) high resolutiion operation is performed by three times; and (2) the logic windows are at 5 by 5 high-resolution pixels. The table data are set in such a manner that, in order to highly resolve a central pixel E with respect to 3 by 3 pixels A to I, the following mean value of bilevel density values of finally obtained high-resolved pixels $e_1$ to $e_g$:

$$R = \Sigma e_j/9 \ 100(\%) \tag{13}$$

is very close to the percent density value $E_0$ (e.g., $E_0=12/16=75\%$ when the gradient of the central pixel E is 12 in 16 gradation levels) of the central pixel E.

Figure 21:
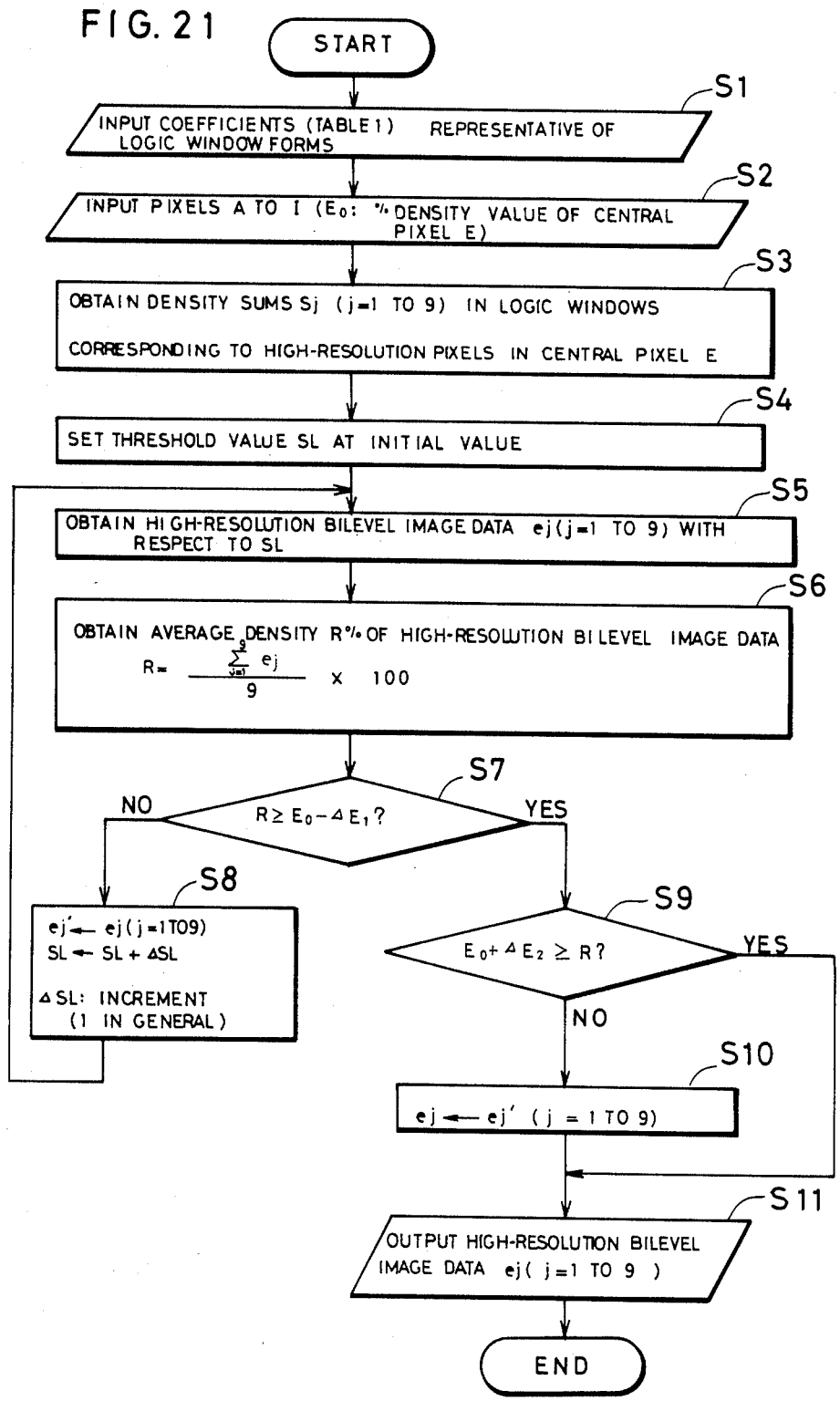
FIG. 21 is a flow chart showing a process for obtaining table data.

FIG. 21 is a flow chart showing an exemplary process for obtaining such table data through use of a calculator. Coefficients (e.g., Table 1) representing logic window forms are inputted at a Step S1, and image on 3 by 3 pixels A to I to be subsequently processed are inputted at a step S2. At this time, the percent density value $E_0$ of the central pixel E is simultaneously inputted or calculated in the calculator. At a step S3, density sum $s_j$ (j=1 to 9) in the logic windows corresponding to respective high-resolution pixels in the central pixel E are obtained, and the threshold value SL is set at an initial value (zero in general) at a step S4. Then the values $s_j$ (j=1 to 9) are detected by SL to obtain high-resolution bilevel image data $e_j$ (j=1 to 9) at a step S5, and the average density R is calculated through the expression (13) at a step S6.

At a step S7, a determination is made as to whether or not $R \geq E_0 - \Delta E_1$ ($\Delta E_1$: prescribed allowable range), and if the determination is "no", the process is advanced to a step S8 to register $e_j$ (j=1 to 9) obtained at the step S5 as $e_j'$ while increasing SL by a prescribed increment $\Delta SL$ (one in general), and the steps S5 to S7 are again repeated. When $R \geq E_0 - \Delta E_1$, the process is advanced to a step S9, to determine whether or not $E_0 + \Delta E_2 \geq R$ ($\Delta E_2$: prescribed allowable range). If the determination is "yes", $E_0 + \Delta E_2 \geq R \geq E_0 - \Delta E_1$ is satisfied and hence the process is advanced to a step S11, to output the current high-resolved bilevel image data $e_j$ (j=1 to 9) as optimum data. If the determination is "no", no R satisfies $E_0 + \Delta E_2 \geq R \geq E_0 - \Delta E_1$, and hence the process is advanced to a step S10 to change $e_j'$ (j=1 to 9) to $e_j$ (j=1 to 9), which in turn are outputted as optimum data at a step S11. At this time, R is less than but nearly equal to $E_0 - \Delta E_1$.

FIG. 22 shows the results of the aforementioned high resolving/bilevelizing processing performed on various 3 by 3 image data. High-resolution bilevel image data $e_j$ (j=1 to 9) obtained are shown in the secind column from the right-hand side. The rightmost column shows the ranges of threshold values SL required for attaining the optimum high-resolved bilevel image $e_j$ (j=1 to 9) through the aforementioned results by the calculator in an inverse manner. Broken lines (1) to (9) in FIG. 20 denote the SL ranges for the density total sum S with respect to image patterns (1) to (9) as shown in FIG. 22. Optimum table data for look-up table 13 are within the ranges of the broken lines (1) to (9).

The respective values $s_j$ thus obtained and the threshold values SL are supplied to a bilevelizing circuit 24 as shown in FIG. 14, to be subjected to processing corresponding to the procedure 5. The bilevelizing circuit 24 is formed by nine comparators 141 to 149 provided in correspondence to the respective $s_j$ operating circuits 51 to 59. The comparators 141 to 149 receive the values $s_j$ from the corresponding $s_j$ operating circuits 51 to 59 as well as receive the threshold values SL from the threshold value decision circuit 16 to compare the same with each other, thereby to output final high-resolved bilevel image data $e_1$ to $e_9$ on condition that, if $s_j > SL$, then $e_j$="1" and if $s_j \leq SL$, then $e_j$="0". Thus, the high-resolution bilevel image data as shown at FIG. 13(F) are obtained.

The 3 by 3 pixels read in the latch circuit 14 as shown in FIG. 14 are sequentially shifted in accordance with scanning/input of the original, and hence the aforementioned processing is repeatedly executed with all of the pixels of the input image being processed as central pixels, whereby bilevel image data obtained by highly resolving the input image by 3 by 3 times are sequentially outputted from the output end 12 of the circuit as shown in FIG. 14.

The data of the look-up table 23 as shown by the solid line in FIG. 20 supply sufficiently practical high-resolution data to most of types of originals. However, if an original contains fine lines of less than one-pixel width, inconvenience is caused as shown in FIG. 23 (particularly in the case of image patterns (2) and (3)). Reasons for this are as follows:

(1) The values of the coefficient ROMs (17a to 17i in FIG. 15) provided by Table 1 are inappropriate.

(2) Data of the look-up table 23 for deciding the threshold values SL are inappropriate.

With respect to item (1), it is necessary to find coefficient ROM data expressing the states of the peripheral pixels as the density sums $s_j$ in the logic windows with further fidelity in comparison with Table 1. The data of Table 1 is corrected to more uniformly reflect the information on the peripheral pixels (e.g., to correct the weighting of 4:6 with respect to the pixels A and B in the logic window $W_1$ in FIG. 13(C) to 4:4), to obtain excellent results. Table 2 shows examples thereof.

TABLE 2

| k | j |   |   |   |   |   |   |   |   |
|---|---|---|---|---|---|---|---|---|---|
|   | 1 | 2 | 3 | 4 | 5 | 6 | 7 | 8 | 9 |
| $K_a$ | 4 | 1 | 0 | 1 | 1 | 0 | 0 | 0 | 0 |
| $K_b$ | 4 | 6 | 4 | 1 | 1 | 1 | 0 | 0 | 0 |
| $K_c$ | 0 | 1 | 4 | 0 | 1 | 1 | 0 | 0 | 0 |
| $K_d$ | 4 | 1 | 0 | 6 | 1 | 0 | 4 | 1 | 0 |
| $K_e$ | 4 | 6 | 4 | 6 | 8 | 6 | 4 | 6 | 4 |
| $K_f$ | 0 | 1 | 4 | 0 | 1 | 6 | 0 | 1 | 4 |
| $K_g$ | 0 | 0 | 0 | 1 | 1 | 0 | 4 | 1 | 0 |
| $K_h$ | 0 | 0 | 0 | 1 | 1 | 1 | 4 | 6 | 4 |
| $K_i$ | 0 | 0 | 0 | 0 | 1 | 1 | 0 | 1 | 4 |

FIG. 24 shows density sums $e_j$ in the logic windows obtained by processing images identical to those in FIG. 23 on the basis of Table 2.

Figure 25:
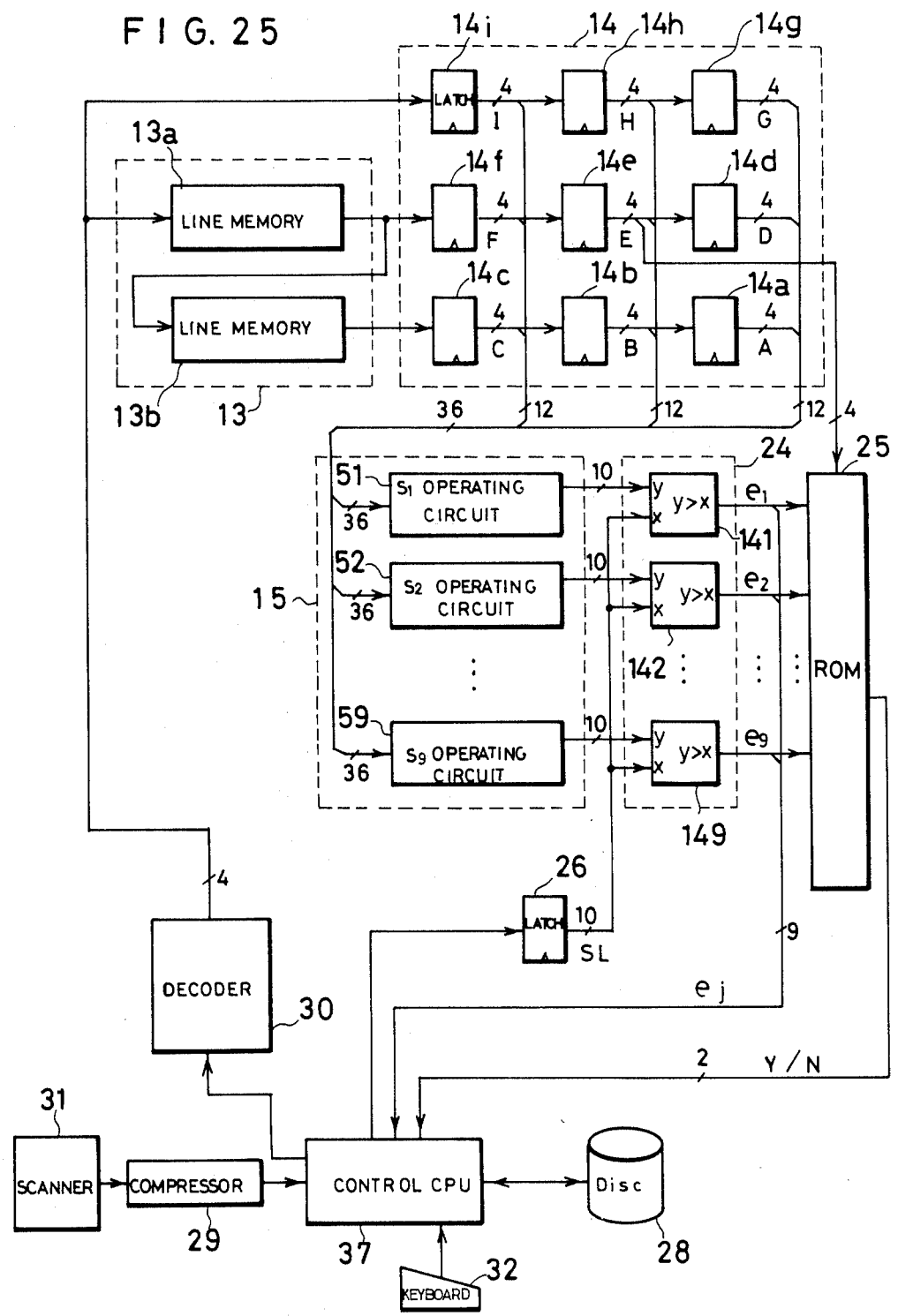
FIG. 25 is a block diagram showing a modification of the second embodiment of the present invention.

With respect to item (2), the table data may be varied with image types (e.g., edge image, reverse fine line image, black fine line image etc.). However, the high-resolution bilevelizing processing as hereinabove described is based on the premise that the same is performed in real time synchronously with scanning by an image scanning/recording device such as a photomechanical scanner, and hence the table data selected in response to image type cannot be changed during scanning. Therefore, the high-resolution bilevelizing processing is not performed in real time and all of original image (image data with gradation) are temporarily stored in a memory device, such as a disc memory, to be appropriately read, so as to obtain high-resolution image data with further fidelity than the originals under control by a computer, etc. FIG. 25 shows an embodiment for performing such processing and FIG. 26 is a flow chart thereof.

Figure 26:
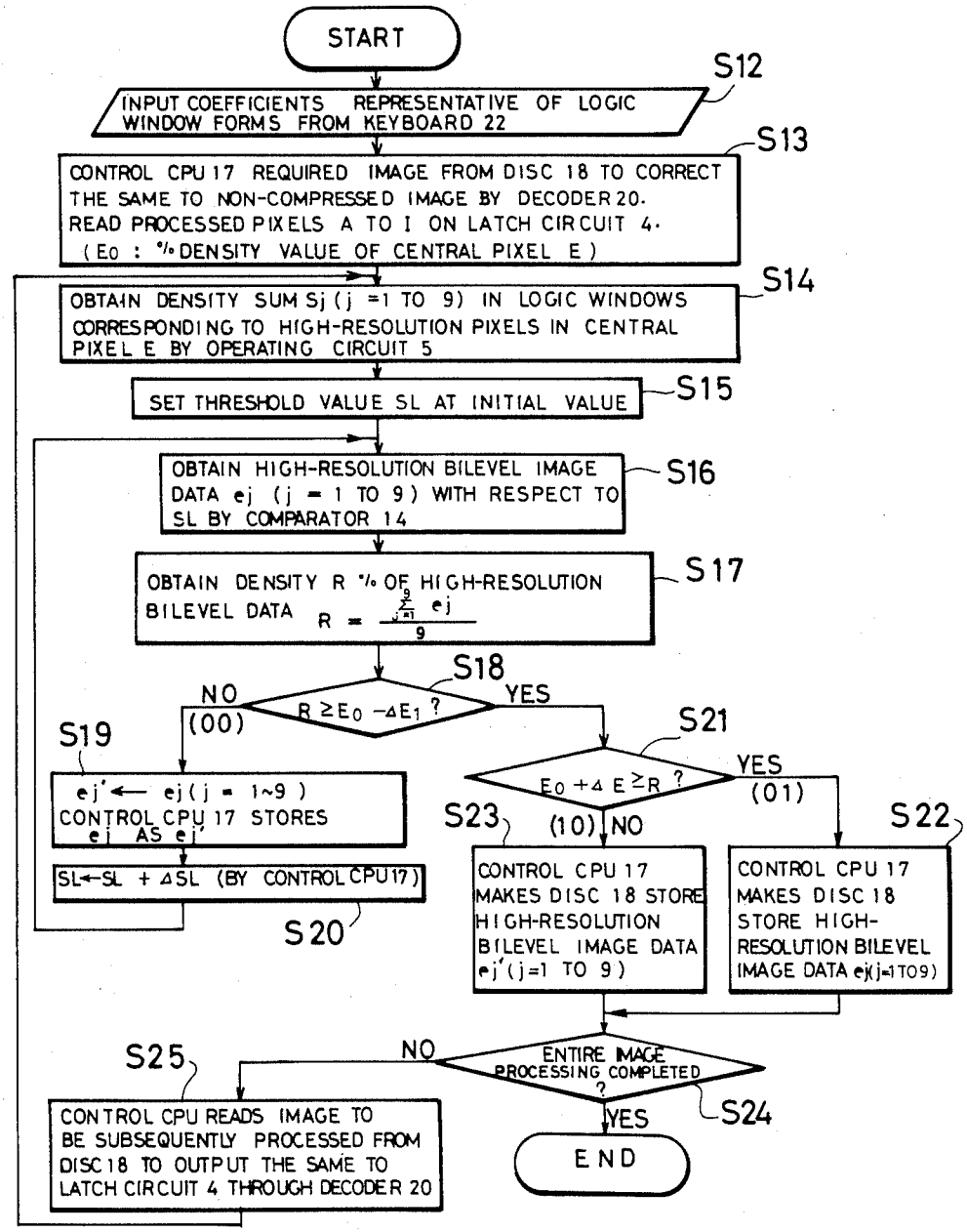
FIG. 26 is a flow chart showing the procedure carried out by the embodiment of FIG. 25.
Figure 27:
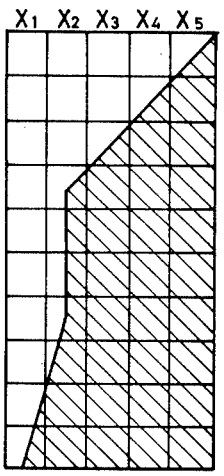
FIG. 27 is a diagram showing data formats.

Referring to FIG. 26, a scanner 3 scans a bilevel original such as that shown at FIG. 27(A), to supply four-bit data with gradation, such as those shown at FIG. 27(B), to a compressor 29. The compressor 29 performs run-length compression of the data only when the input data are at gradation "0" (white) or "15" (black) to output the same, while directly outputting gradation values of intermediate gradation pixels corresponding to edge portions (with format conversion of the data). With reference to FIG. 27, description is now made on the operation of the compressor 29. Assuming that compressed data are eight-bits in width and compressed and non-compressed data are formatted as shown at FIGS. 27(C) and 27(D) respectively while the significance of each format bit is set as shown at FIG. 27(E), data in the column $X_2$ at FIG. 27(B) are compressed as shown at FIG. 27(F). Memory storage capacity of the disc 28 can be saved by such compression. The image data thus compressed by the compressor 29 are stored in the disc memory 28 under control by a control CPU 27. When all of required regions of the originals are completely scanned, high-resolution bilevel conversion is sequentially performed along the processing flow chart as shown in FIG. 26. Required data as commands for such processing and coefficient data (tables 1 and 2) representing logic window forms are supplied to the control CPU 27 through a keyboard 32.

In the high-resolution bilevel conversion operation, the image data stored in the disc 28 are appropriately read under control by the control CPU 27, to be supplied to a decoder 30. The decoder 30 is adapted to perform processing opposite that of the compressor 29, i.e., processing to return the data as shown at FIG. 27(F) to the forms as shown at FIG. 27(B). A line memory device 13, a latch circuit 14, an operating circuit 15 and a comparator 24 operate identically to those in FIG. 14, while clocks for serially shifting the image data along the processing are generated from the control CPU 27 (the clocks are obtained from an image scanning/recording device such as electronic photomechanical process scanner (not shown) in the case of FIG. 14).

A density operating/comparing ROM 25 is formed by a 13-bit input and two-bit output ROM, which is adapted to compare density percentage R uniformly determined by values of inputted high-resolution bilevel image data $e_1$ to $e_9$ with percent density values $E_0$ (consider allowable ranges $\Delta E_1$ and $\Delta E_2$, which are about 10% in general) determined by multi-gradation data of an inputted central pixel E, to output:

$$00 \text{ when } R < E_0 - \Delta E_1 \quad (14)$$

$$01 \text{ when } E_0 - \Delta E_1 \leq R \leq E_0 + \Delta E_2 \quad (15)$$

$$10 \text{ when } E_0 + \Delta E_2 < R \quad (16)$$

through calculation with respect to all of input patterns in advance. Needless to say, similar processing can be performed through a logic circuit without utilizing the ROM. The latch circuit 26 is so provided that the control CPU 27 sets threshold values SL, which can be appropriately changed during processing.

With reference to the flow chart of FIG. 26, description is now made on the operation of the apparatus as shown in FIG. 25 for high-resolution bilevel conversion. At a step S12, coefficients (e.g., Table 2) representing logic window forms are inputted through the keyboard 32. Then, at a step S13, the CPU 27 reads required image data from the disc memory 28, so that the read image data are decoded by decoder 30. The data on 3 by 3 pixels A to I (four-bit each) to be processed are latched in the latch circuit 14. At this time, the data on the central pixel E are supplied to the density operating/comparing ROM 25 as data representing the percent density value $E_0$ thereof.

At a step S14, the operating circuit 15 obtains density sum $s_j$ (j=1 to 9) in the logic windows corresponding to respective high-resolved pixels in the central pixel E, to the same to the comparator 24. At a step S15, the threshold value SL of the comparator 24 is set at an initial value (zero in general), which is latched in the latch circuit 26, and at a step S16, the comparator 24 discriminates $s_j$ (j=1 to 9) by the threshold value SL to obtain high-resolution bilevel image data $e_j$ (j=1 to 9) and output the same to the density operating/comparing ROM 25.

The density operating/comparing ROM 25 performs comparison under the conditions of the expressions (14) to (16) through the data on the central pixel E obtained at the step S13 and the high-resolution bilevel image data $e_j$ (j=1 to 9) obtained at the step S16, to output the results to the control CPU 27 as two-bit determination signals 00, 01 and 10. The processing is completed by a single operation of selecting table data as hereinabove described, while the same is illustrated at steps S17, S18 and S21 in FIG. 26 as successive processing steps. Namely, an average density R (%) of $e_j$ (j=1 to 9) is obtained at the step the S17 and a determination is made as to whether or not $R \geq E_0 - \Delta E_1$ at the step S18. If the determination is "no", the density operating/comparing ROM 25 outputs "00" and the control CPU 27 responsively stores $e_j$ (j=1 to 9) as $e_j'$ at a step S19 and increases the threshold value SL by a prescribed increment $\Delta SL$ (one in general) at a step S20 to make the latch circuit 26 latch the new threshold value SL. The steps S16 to S18 are again repeated, and when $R \geq E_0 - \Delta E_1$, the process is advanced to the step S21, so that the density operating/comparing ROM 25 output "01" when $E_0 + \Delta E_2 \geq R$ and "10" when $E_0 + \Delta E_2 < R$ to the control CPU 27.

The control CPU 27 receives the determination signal of "01" to store the high-resolved bilevel image data $e_j$ (j=1 to 9) in the disc memory 28 at a step S22, or receives the determination signal of "10" to store the high-resolved bilevel image data $e_j'$ (j=1 to 9) in the disc memory 28 at a step S23. In other words, the control CPU 27 employs $e_j$ when it satisfies $E_0 - \Delta E_1 \leq R \leq E_0 + \Delta E_2$, while employing $e_j$ (stored as $e_j'$ at the step S19) less than but close to $E_0 - \Delta E_1$ when no $e_j$ satisfies $E_0 - \Delta E_1 \leq R \leq E_0 + \Delta E_2$ as optimum high-resolution bilevel image data. At a step S24, a determination is made as to whether or not the entire image is completely processed. If the determination is "yes", the high-resolution bilevel conversion is terminated while the process is advanced to a step S25 if the determination is "no", so that the control CPU 27 reads data on an image to be subsequently processed from the disc memory 28. The image data are decoded by the decoder 30 to be supplied to the latch circuit 14, to continue the aforementioned processing.

FIG. 28 shows the results of high resolution bilevel conversion performed on the images of FIG. 23 with Table 2 employed as the coefficients representing the logic window forms along the procedure of the embodiment as shown in FIG. 25 and 26. It is, of course, understood that the states of the originals (central pixels: E) are reproduced in fidelity.

Although the high-resolution operation has been performed by three times and the input image has been processed in the 3 by 3 pixel regions, the said values may be appropriately modified.

According to the present invention as hereinabove described, an original is read in the form of a multi-gradation image to obtain bilevel image data higher in resolution than the said multi-gradation image from which the bilevel image data are obtained. A reproduced image thereby obtained is hegher in fidelity than the original.

Although the present invention has been described and illustrated in detail, it is clearly understood that the same is by way of illustration and example only and is not to be taken by way of limitation, the spirit and scope of the present invention being limited only by terms of the appended claims.

What is claimed is:

1. A method of generating bilevel image pattern data from multi-gradation image data wherein the generated bilevel image pattern data are higher in resolution than the multi-gradation data, said method comprising the steps of:
    relating bilevel image pattern data higher in resolution than said multi-gradation image data to combinations of gradation values of central pixels in image regions of a prescribed size and data patterns of all peripheral pixels thereof and storing said high resolution bilevel image pattern data in a memory;
    reading a bilevel original in the form of multi-gradation image data; and
    outputting from said memory said higher-resolution bilevel image data with respect to each pixel of read multi-gradation image data in response to related gradation values and data patterns of said all peripheral pixels thereof.

2. A method of generating high-resolution bilevel image data in accordance with claim 1, including discriminating data on said peripheral pixels by prescribed threshold values, said data to be processed as image data smaller in gradation number than said central pixels.

3. A method of generating high-resolution bilevel image data in accordance with claim 2, wherein said threshold values depend on a sum of gradation values of the entire peripheral pixel data to be increased or decreased in proportion to said sum, thereby to convert to bilevel values said peripheral pixel data on the basis of said threshold values.

4. An apparatus for generating bilevel image data from multi-gradation image data, the bilevel image data higher in resolution than said multi-gradation data, said apparatus comprising:
    a memory device for relating bilevel image pattern data higher in resolution than said multi-gradation image data to combinations of gradation values of central pixels in image regions of prescribed size and data patterns of all peripheral pixels thereof and storing the same;
    image reading means for reading a bilevel original in the form of multi-gradation image data; and
    means for inputting to said memory device information on the related gradation value of each pixel of read multi-gradation image data and data patterns of said all peripheral pixels thereof and reading from said memory device said high resolution bilevel image pattern data.

5. An apparatus in accordance with claim 4, further including means for discriminating data on said peripheral pixels by prescribed threshold values to convert the same into image data smaller in gradation number than said central pixels, thereby to supply said converted image data to said memory device as information on data patterns of said peripheral pixels.

6. An apparatus in accordance with claim 4, further including a look-up table for storing said threshold values and a sum of gradation values of the entire peripheral pixel data in such a relation that said threshold values are increased or decreased in proportion to said sum, the sum of said entire peripheral pixel data being supplied as an address to said look-up table to read a corresponding threshold value, thereby to convert into bilevel values peripheral pixel data on the basis of said threshold value.

7. A method of generating bilevel image data from multi-gradation image data, the bilevel image data higher in resolution than said multi-gradation image data, said method comprising the steps of:
    reading a bilevel original in the form of multi-gradation image data;
    storing said read multi-gradation image data sequentially in a prescribed image region around a pixel to be processed;
    subdividing said pixel to obtain a high resolution pixel;
    setting, with respect to each high-resolution pixel, a logic window of a prescribed size contained in said prescribed image region around said high-resolution pixel and obtaining a density sum of said multi-gradation image data in said logic window; and
    comparing said density sum with a predetermined threshold value thereby to bilevelize said high-resolution pixel.

8. A method of generating high-resolution bilevel image data in accordance with claim 7, wherein said threshold value is varied with a sum of density values of respective pixels in a prescribed image region around a pixel to be processed.

9. A method of generating bilevel image data from multi-gradation image data, said bilevel image data higher in resolution than said multi-gradition data, said method comprising the steps of:
    reading a bilevel original in the form of multi-gradation image data;
    temporarily storing all of said read multi-gradation image data entirely over required regions of said bilevel original;
    reading said stored multi-gradation image data in prescribed image regions around each pixel to be processed;
    subdividing said pixel to obtain a high resolution pixel;
    setting, with respect to each said high-resolved pixel, with respect to said read multi-gradation image data, a logic window of a prescribed size contained in said prescribed image region around said high-resolved pixel to obtain the density sum of said multi-gradation image data in said logic window;
    obtaining an optimum threshold value such that a difference between (1) an average percent density value obtained by comparing said density value with a certain threshold value and bilevelizing the same and (2) a percent density value of said pixel to be processes, is within a given range; and
    converting said density value into bilevel values by said optimum threshold value.

10. A method of generating high-resolution bilevel image in accordance with claim 9, wherein, the step of temporarily storing includes temporarily storing all of said multi-gradation image data entirely over said required regions of said bilevel original, wherein pixel data of intermediate gradation extending over edge portions of said bilevel original are not compressed while other pixel data are subjected to run-length compression, thereby to reduce the amount of data processed.

11. An apparatus for generating bilevel image data from multi-gradation image data, said bilevel image data being higher in resolution than said multi-gradation image data, said apparatus comprising:

image reading means for reading a bilevel original in the form of multi-gradation image data;

memory means for storing said multi-gradation image data read by said image reading means in a prescribed image region around each pixel to be processed;

means for subdividing said pixels to provide a high reselution pixels;

operating means for receiving image data stored in said memory means to operate, with respect to said high-resolution pixels, the density sum of said multi-gradation image data in a logic window of a prescribed size contained in said prescribed image region around said each high-resolution pixel; and comparing means for comparing said density sum with a previously set threshold value to convert said each high-resolution pixel to bilevel values.

12. An apparatus in accordance with claim 11, further including threshold value changing means for varying said threshold value with a sum of density values of respective pixels in said prescribed image region around said each pixel to be processed.

13. An apparatus for generating bilevel image data from multi-gradation imae data, said bilevel image data higher in resolution than said multi-gradatiion image data, said apparatus comprising:

image reading means for reading a bilevel original in the form of multi-gradation image data;

a memory device for temporarily storing all of said multi-gradation image data read by said image reading means entirely over required regions of said bilevel original;

memory means for temporarily storing said multi-gradation image data read from said memory device in a prescribed image region around a pixel to be processed;

means for subdividing each said pixels to obtain high resolution pixels;

operating means for receiving image data stored in said memory means to operate, with respect to each said high-resolution pixels, the density sum of said multi-gradation image data being within a logic window of a prescribed size contained in said prescribed image region around said each high-resolved pixel;

threshold value set means for setting such an optimum threshold value such that a difference between (1) an average percent density value of high-resolution bilevel image data obtained by comparing said density sum with a predetermined threshold value and converting the same to bilevel valus and (2) the percent density value of said pixel to be processed, is in a given range; and comparing means for comparing said density sum with said optimum threshold value to convert to bilevel values said high-resolution pixel.

14. An apparatus in accordance with claim 13, further including:

a data compressor for performing data compression for temporarily storing said multi-gradation image data entirely over said required regions of said bilevel original in said memory device; and a decoder for decoding compressed data read from said memory device, said compressor performing no compression on pixel data of intermediate gradation extending over edge portions of said bilevel original while performing run-length compression on other pixel data, thereby to reduce the area for storing said original in said memory device.

* * * * *